(12) United States Patent
Ou et al.

(10) Patent No.: US 11,104,060 B2
(45) Date of Patent: Aug. 31, 2021

(54) METHODS AND APPARATUS FOR FABRICATION WITH A MOVABLE SHEET

(71) Applicant: Massachusetts Institute of Technology, Cambridge, MA (US)

(72) Inventors: Jifei Ou, Cambridge, MA (US); Fabian Neumann, Aachen (DE)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 186 days.

(21) Appl. No.: 16/552,382

(22) Filed: Aug. 27, 2019

(65) Prior Publication Data

US 2020/0070410 A1 Mar. 5, 2020

Related U.S. Application Data

(60) Provisional application No. 62/724,291, filed on Aug. 29, 2018.

(51) Int. Cl.
*B29C 64/129* (2017.01)
*B29C 64/321* (2017.01)
(Continued)

(52) U.S. Cl.
CPC .......... *B29C 64/129* (2017.08); *B29C 64/205* (2017.08); *B29C 64/321* (2017.08);
(Continued)

(58) Field of Classification Search
CPC ... B29C 64/129; B29C 64/124; B29C 64/135; G03F 7/0002
See application file for complete search history.

(56) References Cited

U.S. PATENT DOCUMENTS 8,282,380 B2 10/2012 Pax et al.
8,287,794 B2 10/2012 Pax et al.
(Continued)

FOREIGN PATENT DOCUMENTS

WO 2014126837 A2 8/2014

OTHER PUBLICATIONS

Benchoff, B., The IP of the Infinite Build vol. 3D Printer, published at Hackaday.com on Jun. 6, 2017 at https://hackaday.com/2017/06/06/the-ip-of-the-infinite-build-volume-3d-printer/.
Blackbelt, Blackbelt-3d.com website, published at blackbelt-3d.com on Jan. 7, 2018 or earlier (captured on Internet Archive Wayback Machine on Jan. 7, 2018 at https://web.archive.org/web/20180107191140/https://blackbelt-3d.com/).
(Continued)

*Primary Examiner* — Joseph S Del Sole
*Assistant Examiner* — Mohamed K Ahmed Ali
(74) *Attorney, Agent, or Firm* — Daly, Crowley, Mofford & Durkee, LLP

(57) ABSTRACT

A long sheet may travel lengthwise through a fabrication system. The sheet may be much longer than it is wide or high. One or more objects that are being fabricated may be attached to the sheet. The sheet may move, step by step, through a vat of liquid photopolymer while a digital micromirror device projects a sequence of images unto a surface of the liquid. At each step, a projected light image may cure liquid photopolymer, thereby producing solid, cured polymer that becomes part of an object being fabricated. The sheet may be included in the final fabricated object, or may be a sacrificial material that is removed from the final fabricated object. Alternatively, the sheet may be in the shape of a loop. Or, the sheet may be detached from the final fabricated object and then fed through the system again.

20 Claims, 10 Drawing Sheets

(51) Int. Cl.
  *B29C 64/205* (2017.01)
  *C08F 2/46* (2006.01)
  *B33Y 10/00* (2015.01)
  *B33Y 30/00* (2015.01)

(52) U.S. Cl.
  CPC .............. *C08F 2/46* (2013.01); *B33Y 10/00* (2014.12); *B33Y 30/00* (2014.12)

(56) References Cited

U.S. PATENT DOCUMENTS

| | | | |
|---|---|---|---|
| 2015/0224718 A1 | 8/2015 | Ederer et al. | |
| 2016/0303795 A1* | 10/2016 | Liu | B29C 64/25 |
| 2016/0368210 A1* | 12/2016 | Chen | B29C 64/106 |
| 2017/0129175 A1 | 5/2017 | Zitelli et al. | |

OTHER PUBLICATIONS

Boissonneault, T., Robot Factory introduces new Sliding-3D printer with "infinite" build surface; published by 3D Printing Media Network on Jul. 5, 2018 at https://www.3dprintingmedia.network/robot-factory-sliding-3d-printer-infinite-plane/.

Swaleh, Make 3D Printing Infinite: Automatic Infinite 3D Printer—Conveyor Belt 3D Printer; screenshots at times 0:00 and 1:32 from video posted on YouTube on Jun. 4, 2018 at https://www.youtube.com/watch?v=pvIzVv26Guw.

Tess, New Printrbelt 3D printer by Printrbot lets you print with 'Infinite Z', published on Jul. 3, 2017 at https://www.3ders.org/articles/20170703-new-printrbelt-3d-printer-by-printrbot-lets-you-print-with-infinite-z.html.

* cited by examiner

METHODS AND APPARATUS FOR FABRICATION WITH A MOVABLE SHEET

RELATED APPLICATIONS

This application claims the benefit of U.S. Provisional Application No. 62/724,291 filed Aug. 29, 2018 (the "Provisional").

FIELD OF TECHNOLOGY

The present invention relates generally to additive manufacturing.

SUMMARY

In illustrative implementations of this invention, a long sheet travels lengthwise through a fabrication system. The sheet may be much longer than it is wide or high. One or more objects that are being fabricated may be attached to the sheet and may move with the sheet. The sheet may comprise a polymer, such as nylon fabric. The sheet may move, step by step, through a vat of liquid photopolymer while a digital micromirror device projects a sequence of images unto a surface of the liquid photopolymer. At each step, a projected light image may cure liquid photopolymer, thereby producing a new layer of solid, cured polymer. This new layer may be photocured in such a way that the new layer is attached (at least temporarily) to: (a) the moving sheet and (b) the object being fabricated.

In some cases, the sheet is included in, and remains a permanent part of, the final fabricated object. In other cases, the sheet is a sacrificial material that is removed from the final fabricated object. In yet other cases, the sheet forms a loop that travels around a path. In still other cases, the sheet is detached from the final fabricated object and then reused, by being fed through the fabrication system again.

In illustrative implementations, the long, movable sheet extends the length of the build volume of the fabrication system. This in turn enables fabrication of very long objects.

Furthermore, the long, movable sheet may enable multiple objects to simultaneously undergo different steps in an overall fabrication process, while remaining on the same movable sheet. For instance, three objects that are being fabricated may be attached to and may be moving with a single long sheet, while the first object is being formed by photocuring, the second object is being dried, and the third object is being cleaned. This may enable more rapid, automated fabrication, as compared to a conventional 3D printing system in which objects are manually removed from a conventional build surface and manually transported to different post-processing stations.

In illustrative implementations of this invention, the lens of a digital micromirror device (DMD) may be in a fixed position relative to walls of a vat that contains liquid photopolymer, onto which the DMD is projecting images. This may enable the system to fabricate objects more quickly, without moving any nozzle or printhead.

In illustrative implementations if this invention, the DMD may project images in a substantially continuous manner, thereby enabling photocuring to form layers substantially continuously. This too may facilitate rapid fabrication.

In illustrative implementations, a computer may employ a program that represents the object to be fabricated as a set of lines instead of a mesh file (e.g., .stl mesh file). This program may enable dense arrays of micropillars, hairs or microlattices to be represented by much less data than would be required for a conventional mesh representation.

The Summary and Abstract sections and the title of this document: (a) do not limit this invention; (b) are intended only to give a general introduction to some illustrative implementations of this invention; (c) do not describe all of the details of this invention; and (d) merely describe non-limiting examples of this invention. This invention may be implemented in many other ways. Likewise, the Field of Technology section is not limiting; instead it identifies, in a general, non-exclusive manner, a field of technology to which some implementations of this invention generally relate.

Figure 1:
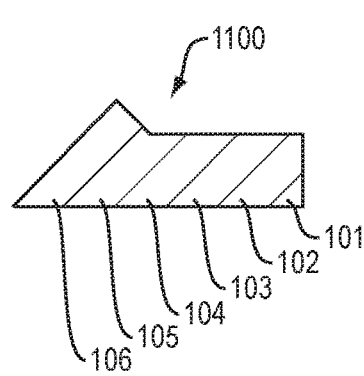
FIG. 1 is a cross-sectional view of a fabricated object.

The above Figures are not necessarily drawn to scale. The above Figures show illustrative implementations of this invention, or provide information that relates to those implementations. The examples shown in the above Figures do not limit this invention. This invention may be implemented in many other ways.

DETAILED DESCRIPTION

In illustrative implementations of this invention, a long sheet (e.g., of nylon fabric) is fed through a fabrication system. This sheet may be much longer than it is wide or high. For instance, in some cases, the sheet is more than 100 meters long. This long sheet may be thin in a vertical direction. Furthermore, this long sheet may be flexible, and may have a shape that would be flat if the sheet were laid out on a flat surface.

This long sheet may be fed, lengthwise, into a vat of liquid photopolymer while a digital micromirror device (DMD) projects a temporal sequence of light images onto an upper surface of the liquid photopolymer. The DMD may be synchronized with stepper motors that actuate movement of the sheet, in such a way that, during each time period that starts with a step of motion caused by the stepper motors and ends with the next step of motion, the DMD projects a separate image. Put differently, the sheet may descend into the liquid photopolymer step-by-step, where each step corresponds to a step of the stepper motors. At each step, a different portion of the long sheet may enter the liquid photopolymer. At each step, the DMD may project a separate image onto the upper surface of the liquid polymer. Each image projected by the DMD may cure a portion of the liquid photopolymer, thereby creating a new solid layer of cured polymer that forms part of an object being fabricated. Each new solid layer may be formed in such a way that it is attached to the moving sheet.

Each image that is projected by the DMD may be a spatial pattern of light. In some cases, each projected spatial pattern of light cures liquid photopolymer only in "positive" regions of the spatial pattern where there is light. Thus, each solid layer that is formed may have, at the time it cures, a 2D geometric shape (in a 2D plane parallel to the upper surface of the liquid photopolymer) that coincides with the "positive" regions of the spatial light pattern that created the layer.

During some time intervals, identical images may be projected by the DMD multiple times before changing. This may correspond to fabricating multiple layers of a solid object that all have the same geometry. During other time intervals, the images projected by the DMD may change from image to image. This may correspond to fabricating multiple layers of a solid object that each have a different geometry. In some use scenarios, the geometry of the spatial light patterns that are projected may change only slightly from image to image. This may correspond to fabricating multiple layers that form a surface that approximates a curve.

The solid layers that are produced may be very thin, may comprise the same material, and may partially fuse with their neighboring layers. As a result, two neighboring layers of the object being fabricated (which correspond to two successive images projected by the DMD) may be indistinguishable (or almost indistinguishable) from each other, to the unaided human eye.

The DMD may project images almost continuously during the fabrication process. For instance, in some use scenarios, the time period during which a single image is projected may be more than 100 times longer—or more than 1000 times longer—than the time that elapses during a gap between two successive images. (For instance, a temporal gap may occur while micromirrors in the DMD are changing position from one image to the next).

The solid object being formed may be attached to the moving sheet. As portions of the sheet move step-by-step deeper into the vat of liquid photopolymer, the object being fabricated may move simultaneously with the sheet.

The vertical thickness of each solid layer that is formed may depend on: (a) the resolution of the stepper motors that actuate movement of the sheet; and (b) the angle at which the sheet enters the liquid photopolymer. For instance, in a prototype of this invention: (a) the step size employed by the stepper motors is 31 micrometers; (b) the sheet moves in steps that are each 31 micrometers long; (c) the sheet enters the liquid photopolymer at an angle of 45 degrees relative to the upper surface of the liquid photopolymer; and (d) thus, the vertical thickness of each solid layer that is formed is 22 micrometers. The prototype described in the preceding sentence is a non-limiting example of this invention. In many implementations of this invention, the step sizes (for the stepper motors) and vertical thickness of the layers are different than in this provisional.

FIG. 1 is a cross-sectional view of an object that is being fabricated, in an illustrative implementation of this invention. Object 1100 comprises layers 101, 102, 103, 104, 105, 106. For clarity of illustration, in FIGS. 1, 2, 3, 11A and 11B, only a small number (e.g., six) layers are shown and each layer is fairly thick relative to the overall size of the object being fabricated. In practice, however, there may be many more layers in a fabricated object (e.g., hundreds, thousands or millions of layers). Likewise, in practice, each layer may be very thin relative to the whole object being fabricated.

Figure 2:
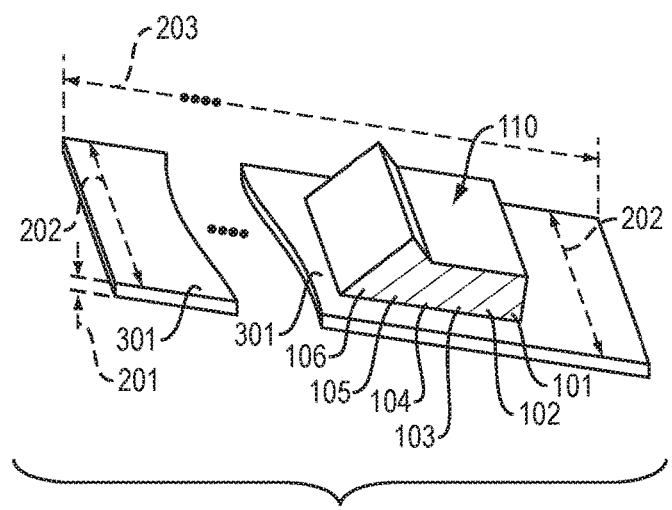
FIG. 2 shows a movable sheet.

FIG. 2 shows a movable sheet 301, in an illustrative implementation of this invention. In FIG. 2, sheet 301 is shown in an unrolled state in which it is stretched out to its maximum length along a straight line. In practice, however, portions of sheet 301 (e.g., a starting roll, ending roll or both) may be rolled up. Furthermore, sheet 301 may bend as it is fed through a fabrication system along a curved path. For instance, sheet 301 may be pulled from a first roll (of the sheet), then fed through a fabrication system along a curved path, and then either (a) be sacrificed (e.g., by chemical reaction or mechanical abrasion); (b) be rolled into a second roll (of the sheet), or (c) remain attached to and part of the object being fabricated.

In the example shown in FIG. 2, the length 203 of sheet 301 is much greater (e.g., more than a hundred times greater) than the width 202 of sheet 301. Likewise, in FIG. 2, the length 203 of sheet 301 is much greater (e.g., more than a hundred times greater) than the height 201 of sheet 301. Furthermore, in FIG. 2, the width 202 of sheet 301 is much greater (e.g., more than twenty times greater) than the height 201 of sheet 301.

Advantageously, the length of the sheet (e.g., 100 meters to 200 meters) may allow the build volume of the fabrication system to also be very long. Thus, in some cases, the length of the build volume is much greater than the width or height of the build volume. This is because, during fabrication of an object, sheet 301 may be fed through the fabrication system. During fabrication of an object, a portion of sheet 301 that is much longer than the width or height of the build volume may pass through a region in which photopolymer is cured by being exposed to light. Thus, in some use scenarios, an object that is almost as long as sheet 301 may be fabricated. For instance, the object that is fabricated may itself have a length that is much greater (e.g. more than a hundred times greater) than each of the following, individually: (a) the width of the build volume; (b) the height of the build volume; (c) the width 202 of sheet 301, and (d) the height 201 of sheet 301.

Alternatively, in some use scenarios, multiple, relatively short objects are fabricated while sheet 301 is fed through the fabrication system. These multiple objects may (at least when initially fabricated) be attached to sheet 301. The long length of sheet 301 may facilitate rapid, automated fabrication of multiple objects. This is because automated fabrication steps may occur (e.g., simultaneously) for multiple objects attached to the same, long sheet, even after the multiple objects have been formed by photocuring. This may avoid a problem of some conventional 3D printers, which require fabricated objects to be manually removed from a conventional build surface.

Sheet 301 may comprise a strong, flexible material. For instance, in some cases, sheet 301 comprises a polymer (e.g., nylon fabric), leather, or metallic mesh.

Figure 3:
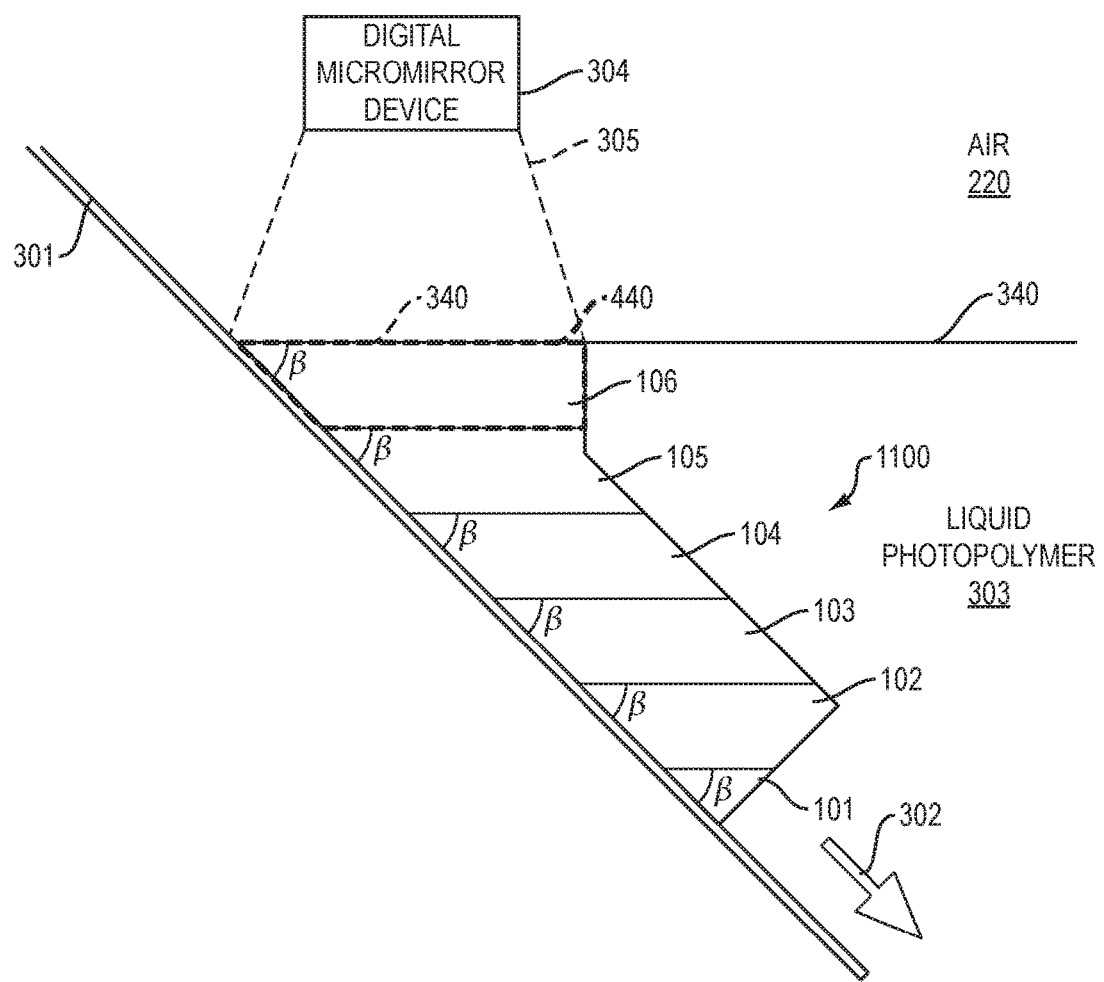
FIG. 3 shows fabrication with a digital micromirror device and a movable sheet.

FIG. 3 shows fabrication with a digital micromirror device and a movable sheet, in an illustrative implementation of this invention. In FIG. 3, sheet 301 is undergoing a net movement in direction 302. The object 1100 that is being fabricated is attached (e.g., by chemical bonds, mechanical bonds or adhesion) to sheet 301. Thus, as sheet 301 undergoes a net movement in direction 302, object 1100 simultaneously undergoes a net movement in direction 302.

In FIG. 3, each layer of object 1100 is formed by exposing region 440 of liquid photopolymer 303 to light 305. In the example shown in FIG. 3, layers 101, 102, 103, 104, 105, 106 were formed in a temporal sequence which included the following steps: First, layer 101 was fabricated, by exposing region 440 of liquid photopolymer 303 to light 305 that was emitted by DMD 304. This photocuring caused layer 101 to solidify in such a way that layer 101 attached to sheet 301. Second, sheet 301 underwent a net movement in direction 302, thereby causing photocured layer 101 to move away from region 440. Third, liquid photopolymer flowed (or otherwise moved) into region 440. Fourth, layer 102 was fabricated, by exposing region 440 of liquid photopolymer 303 to light 305 emitted by DMD 304. This photocuring caused layer 102 to solidify in such a way that layer 102 attached to layer 101 and to sheet 301. Fifth, sheet 301 underwent a net movement in direction 302, thereby causing photocured layers 101 and 102 to move away from region 440. Sixth, liquid photopolymer flowed (or otherwise moved) into region 440. Seventh, layer 103 was fabricated, by exposing region 440 of liquid photopolymer 303 to light 305 emitted by DMD 304. This photocuring caused layer 103 to solidify in such a way that layer 103 attached to layer 102 and to sheet 301. Eighth, sheet 301 underwent a net movement in direction 302, thereby causing photocured layers 101, 102 and 103 to move away from region 440. Ninth, liquid photopolymer flowed (or otherwise moved) into region 440. This process (photocuring, then net movement of sheet 301, then liquid photopolymer moving again into region 440) was repeated until all layers (i.e., 101, 102, 103, 104, 105, 106) of object 1100 were fabricated.

Liquid photopolymer 303 may comprise any type of liquid light-activated resin, including any resin, enamel or varnish that polymerizes when exposed to light. For instance, photopolymer 303 may comprise a mixture of monomers, oligomers and photoinitiators that changes (cures) into a hardened polymeric material when exposed to light. In some cases, oligomers in photopolymer 303 become cross-linked when exposed to light, forming a solid material that comprises a networked polymer. For instance, photopolymer 303 may include oligomers such as acrylated epoxy, acrylated urethane, acrylated polyether, or acrylated polyester. In some cases, photopolymer 303 includes monomers such as styrenic compounds, vinyl ethers, N-vinyl carbazoles, lactones, lactams, cyclic ethers, cyclic acetals and cyclic siloxanes.

In some cases, photopolymer 303 includes photoinitiators that, when exposed to light, decompose into one or more reactive materials that activate polymerization of functional groups in oligomers. For instance, photopolymer 303 may contain cationic photoinitiators, such as onium salts, organometallic compounds or pyridinium salts. In some cases, photopolymer 303 contains free-radical photoinitiators, such as: (a) abstraction type photoinitiators (e.g., benzophenone, xanthone or quinone) which generate a free radical by abstracting a hydrogen atom from a donor compound; or (b) cleavage-type photoinitiators (e.g., benzoin ether, acetophenone, benzoyl oxime, or acylphosphine) which generate two free radicals by cleavage.

Digital micromirror device 304 may emit light 305 that is in the ultraviolet range or the visible light range. For instance, in a prototype of this invention, DMD 304 emits light at a wavelength of 405 nm.

The light 305 that is emitted by DMD 304 may: (a) exit the digital micromirror device 304; (b) then travel through air 220; (c) then pass through a liquid/air surface 340 (between air 220 and liquid photopolymer 303); and (d) then illuminate photopolymer 303 in region 440, thereby causing photopolymer in that region to polymerize (cure) into a solid layer.

Digital micromirror device (DMD) 304 may comprise an MOEMS (micro-opto-electromechanical system) that is a projector. For instance, DMD 304 may comprise a DLP® (Digital Light Processing®) projector. In some cases, DMD 304 includes many (e.g., hundreds of thousands of) micromirrors that are metallic and that are each less than 20 micrometers in width. Each micromirror may be attached to torsional hinges and may rotate (e.g., within a range of 20-24 degrees) due to electrostatic attraction to, or repulsion from, charged electrodes of the DMD. The DMD may separately control orientation of each of the micromirrors, thereby controlling whether light that reflects from each micromirror is included in an image projected by the DMD. A DMD may vary, over time, a spatial pattern of light emitted (projected) by the DMD, by separately controlling and changing orientation of micromirrors in the DMD. When a micromirror of DMD 304 is in an "on" state, the micromirror may reflect light toward a lens of the DMD, in such a way that the light passes through the lens, and exits from (and thus is projected by) the DMD. When a micromirror of DMD 304 is in an "off" state, the micromirror may reflect light in a direction away from the lens, in such a way that the light is not part of the image projected by the DMD. In some cases, each micromirror of the DMD is separately addressable and is associated with one or more pixels of an image projected by the DMD.

In some cases, a DMD rapidly toggles a micromirror "on" and "off", in order to create grayscale for a pixel (of the projected image) that is associated with the micromirror. In some cases, a DMD projects a color image. For instance, a DMD may include a spinning mechanical color wheel and a single DMD chip that has an array of micromirrors. Or, for instance, the DMD may include three DMD chips that each have an array of micromirrors and that each project a different color of light.

In the example shown in FIG. 3, a horizontal surface 340 of liquid photopolymer 303 is at an acute angle β relative to movable sheet 301 at all times while sheet 301 undergoes net movement in direction 302. Put differently, in FIG. 3, sheet 301 enters liquid photopolymer 303 at an acute angle β relative to horizontal surface 340 of the liquid photopolymer. Horizontal surface 340 is at a boundary between air 220 and the liquid photopolymer 303. In a prototype of this invention, β equals 45 degrees. However, β may be any acute angle, depending on the particular implementation of this invention.

In FIG. 3, solid layers 101, 102, 103, 104, 105, 106 (of the object being fabricated) are tilted relative to movable sheet 301. Specifically, solid cured layers 101, 102, 103, 104, 105, 106 each include a planar face that is at an acute angle β relative to movable sheet 301. This is because, when each layer was cured: (a) a planar face of the layer was co-located with a horizontal, planar, upper surface 340 of liquid photopolymer 303; (b) surface 340 (and thus the top of the layer as it cured) was at an acute angle β relative to movable sheet 301; and (c) the layer adhered to movable sheet 301 (e.g., due to curing).

In some cases, after the initial curing, the angles at which layers 101, 102, 103, 104, 105, 106 are tilted relative to movable sheet 301 vary over time and are not always equal to each other. In some cases, this occurs because: (a) the photocured layers are flexible and adhere to sheet 301; and (b) after the initial curing, sheet 301 bends as it moves along a curved path in a fabrication system, thereby causing the photocured layers to simultaneously bend; and (c) the bending of sheet 301 and the layers that adhere to it cause the angle between each layer and the sheet to vary over time.

Figure 4A:
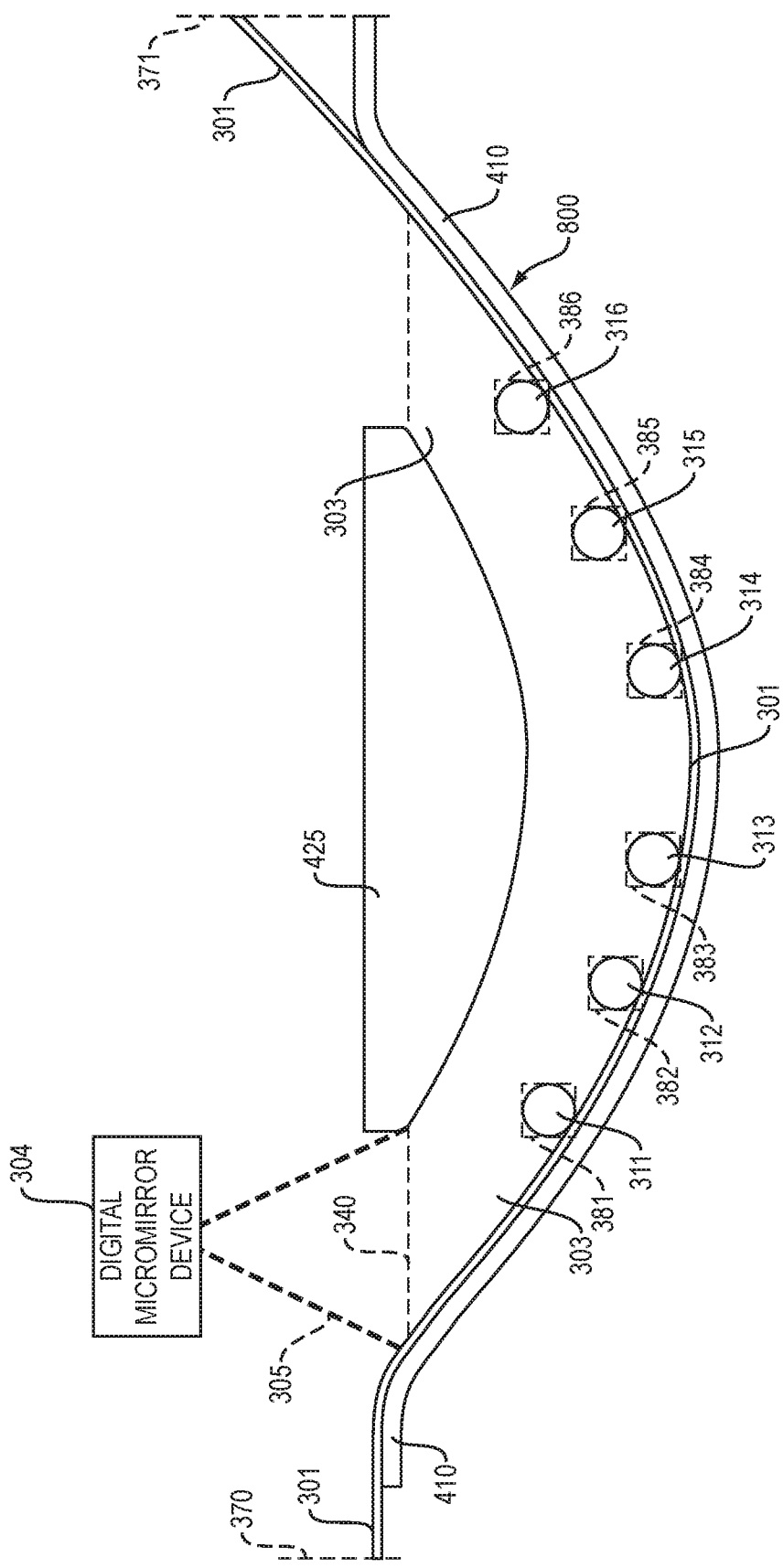
FIGS. 4A, 4B and 5 are cross-sectional views of portions of a system for additive manufacturing.
Figure 4B:
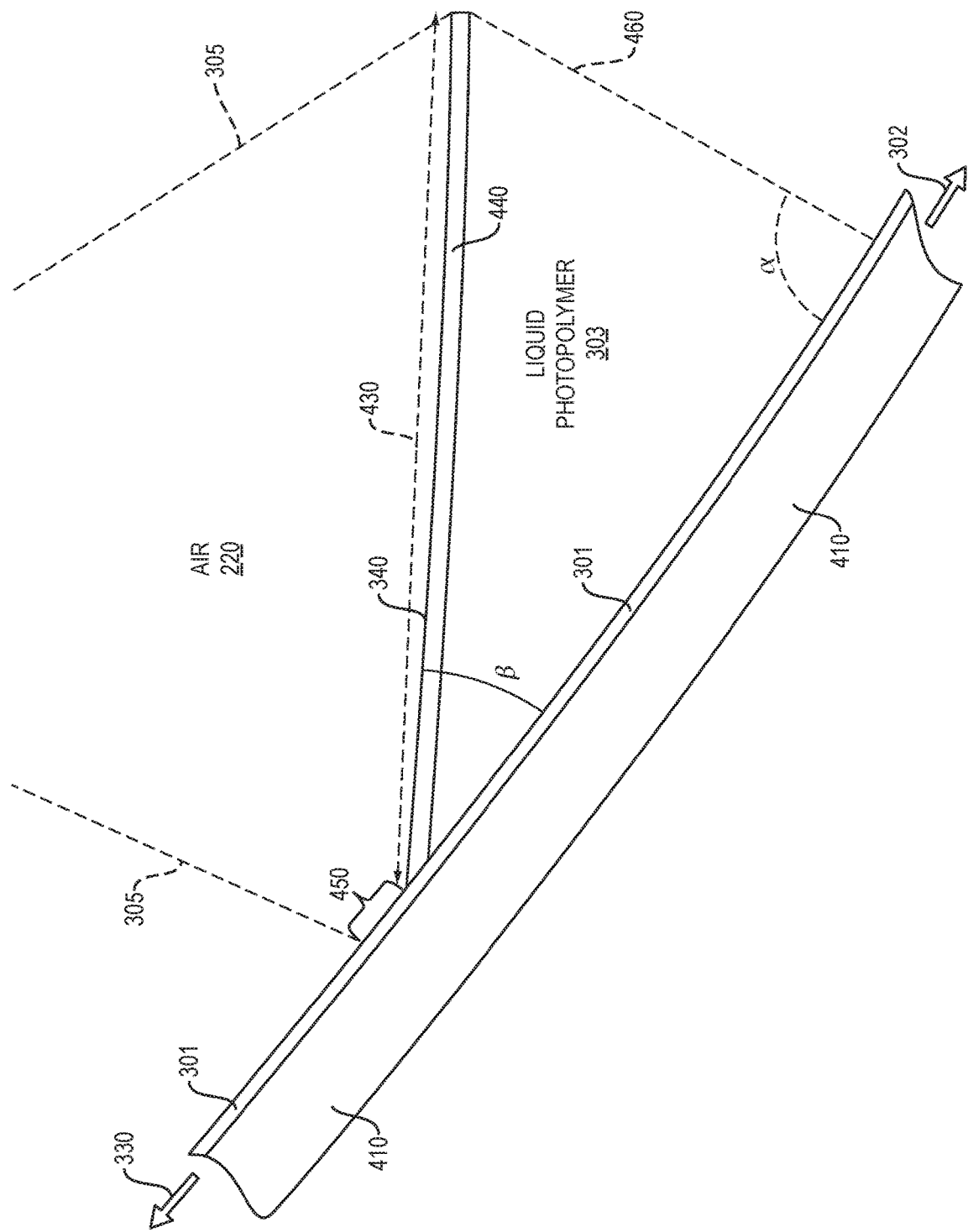
Figure 5:
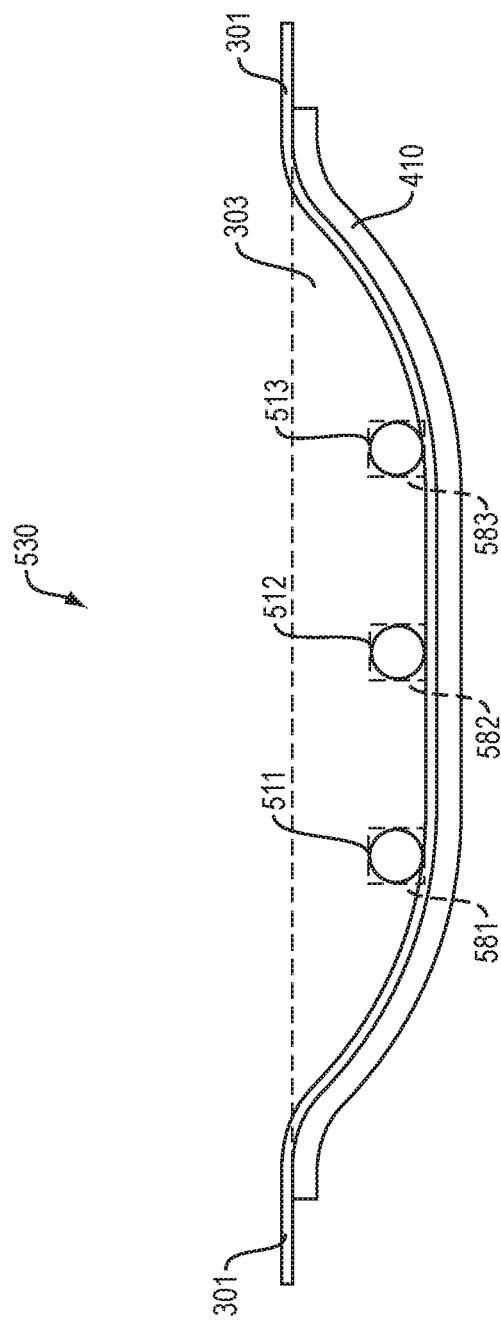

FIGS. 4A, 4B and 5 are cross-sectional views of portions of a system for additive manufacturing, in illustrative implementations of this invention.

Sheet 301 (as a whole) may be much longer than the portion of sheet 301 that is shown in FIG. 4A. (The same also applies to FIGS. 4B and 5). Sheet 301 may be fed through the fabrication system. For instance: (a) a particular region of sheet 301 may travel from location 370 (on the left side of FIG. 4A) to location 371 (on the right side of FIG. 4A); (b) as a first region of sheet 301 moves away from location 370, a second region of sheet 301 may enter at location 370; and (c) thus different portions of sheet 301 may occupy location 370 at different times.

Figure 8:
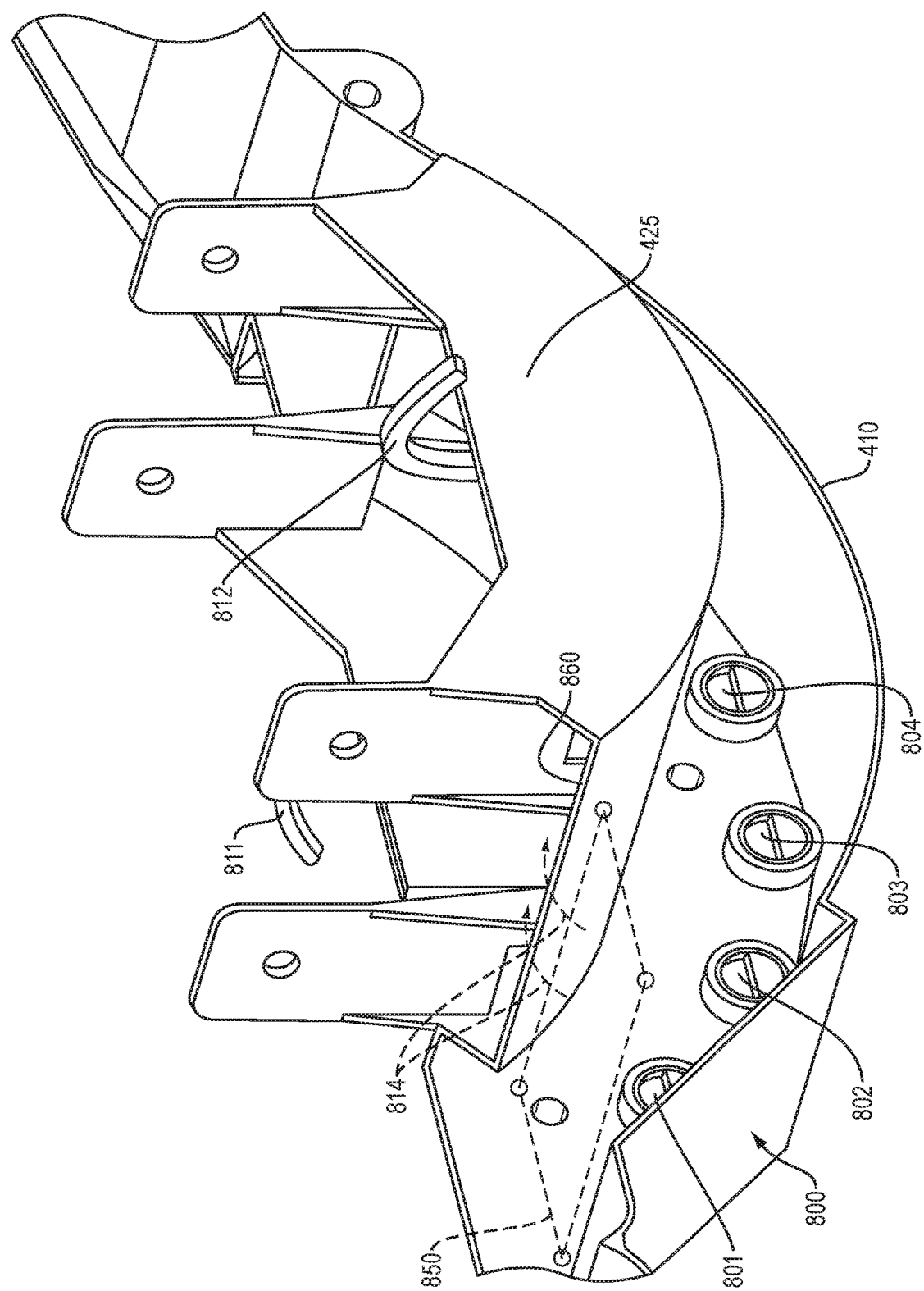
FIG. 8 is a perspective view of a main vat and a resin leveling reservoir.

Sheet 301 undergoes net motion that causes portions of the sheet to travel through a vat 800 that contains liquid photopolymer 303. We sometimes call this vat 800 the "main vat". FIG. 4A and FIG. 8 are a cross-sectional view and a perspective view, respectively, that show, among other things, the main vat. Main vat 800 may include a vat wall 410 and actuators (e.g., 311, 312, 313, 314, 315, 316).

The main vat 800 is shown in FIG. 4A. An entry portion of main vat 800 is shown in FIG. 4B.

Before sheet 301 reaches main vat 800, sheet 301 passes through a preprocessing vat 530 where sheet 301 is coated or soaked with liquid photopolymer. This preprocessing step (of soaking or coating sheet 301 with liquid photopolymer) prepares sheet 301 for a later step in which a build substrate is attached to the moving sheet. This later step may occur at the edge of liquid photopolymer in main vat 800. In the later step, the liquid photopolymer that has soaked into (or coated) sheet 301 is cured by light from DMD 304, thereby forming a build substrate that is attached to sheet 301. The object being fabricated may then be fabricated in such a way that it attaches to the build substrate.

Specifically, the liquid photopolymer that has coated or soaked sheet 301 in the preprocessing vat may later be cured by exposure to light in region 450, shown in FIG. 4B. Region 450 may be a thin strip (e.g. 200 to 400 micrometers wide) that is adjacent to, parallel to, and slightly higher than, an edge of an upper surface 340 of the liquid photopolymer 303 in main vat 800. Very shortly before a given portion of sheet 301 descends into the liquid photopolymer in main vat 800, the given portion of sheet 301 may pass through region 450. While the given portion of sheet 301 is located in region 450, light from DMD 304 may cure the liquid photopolymer in region 450 (which has soaked into or coated sheet 301), and may thereby create a build substrate that is attached to the given portion of sheet 301. The width of region 450 may be less than or equal to the width of sheet 301. During some time periods, DMD 304 may project light onto all of region 450, thereby creating a portion of a build substrate, which portion covers the entire width of region 450. Alternatively, during some time periods in which a specific portion of sheet 301 is located in region 450, DMD 304 may project light onto only selected portions of region 450, thereby creating a specific portion of a build substrate, which specific portion covers only selected parts of sheet 301. These selected parts of sheet 301 (where a build substrate is formed) may correspond to regions where liquid photopolymer will later be cured adjacent to that specific portion of sheet 301, when that specific portion of sheet 301 descends into the liquid photopolymer in main vat 800.

While DMD 304 projects light onto region 450 (to create a build substrate), DMD 304 may also project light onto the upper surface 340 of the liquid photopolymer 303 in main vat 800 (to form layers of the object being fabricated). Specifically, DMD 304 may project a temporal sequence of images, in such a way that each image cures a different layer of photopolymer. The resulting solid layers of photopolymer may comprise the object being fabricated, as discussed above.

In FIGS. 4B, 5, 6, 7, 8 and 9, actuators (e.g., 311, 312, 313, 314, 315, 316, 511, 512, 513, 601, 611, 630, 714, 801, 802, 803, 804, 901, 903, 904) may comprise wheels or rollers. The wheels or rollers may rotate and may thereby cause sheet 301 to move. The rotation of the wheels or rollers may be actuated by electric motors (e.g., 381, 382, 383, 384, 385, 386, 581, 582, 583, 603, 613, 633, 784, 981, 983, 984). For instance, the motors may comprise stepper motors or servo motors. In some use scenarios, the motors cause the sheet to always move in the same direction (at least at a particular spatial point in the sheet's path). In other use scenarios, the motors cause the sheet to repeatedly change (e.g., reverse) direction of travel. The motors may repeatedly reverse the direction in which the wheels or rollers rotate (e.g., change from clockwise to counterclockwise, or vice versa), and may thereby repeatedly reverse the linear direction in which sheet 301 travels.

Alternatively, any other type of actuator may cause sheet 301 to move in FIGS. 4B, 5, 6, 7 and 9. For instance, a rack and pinion actuator may cause sheet 301 to move. The rack and pinion actuator may in turn be actuated by an electric motor.

In FIG. 4B, β is the angle between liquid/air surface 340 and sheet 301. In FIG. 4B, distance 430 is what we call loosely call the height of the projection area ("$h_{projection}$"). In FIG. 4B, distance 460 is the height of the build volume and is what we call "$h_{print}$". In FIG. 4B, $h_{print}=\sin(\beta) \times h_{projection}$.

In the example shown in FIG. 5, sheet 301 passes through a preprocessing assembly that soaks or coats sheet 301 with liquid photopolymer. In FIG. 5, the preprocessing assembly includes a preprocessing vat 530, and actuators (e.g., 511, 512, 513). Preprocessing vat 530 contains liquid photopolymer 303 that coats or soaks sheet 301 as the sheet is fed through preprocessing vat 530.

Each attachment between two neighboring solid layers of object 1100 (or between sheet 301 and a solid layer of object 1100, or with a build substrate) may be formed by one or more of: chemical bonds, mechanical bonds, electrostatic attraction, and adhesion. Each attachment between sheet 301 and a solid layer of object 1100 may be indirect via a build substrate that has been formed by projection of light onto region 450, as described above. Put differently: (a) sheet 301 may be attached to the build substrate; and (b) the build substrate may be attached to the solid layer of object 1100.

During—and after—the time that an object is fabricated by the fabrication system, the sheet may continue to be fed through the fabrication system. Thus, the fabricated object (and the portion of the sheet to which it is attached) may continue to undergo net motion away from the region in which photocuring occurs. As discussed above, this net motion may be actuated by actuators (e.g., 311, 312, 313, 314, 315, 316, 511, 512, 513, 601, 611, 630, 714, 801, 802, 803, 804, 901, 903, 904). This net motion may cause the fabricated object—and the portion of sheet 301 to which it is attached—to pass through main vat 800 and then through an exit assembly.

Figure 6:
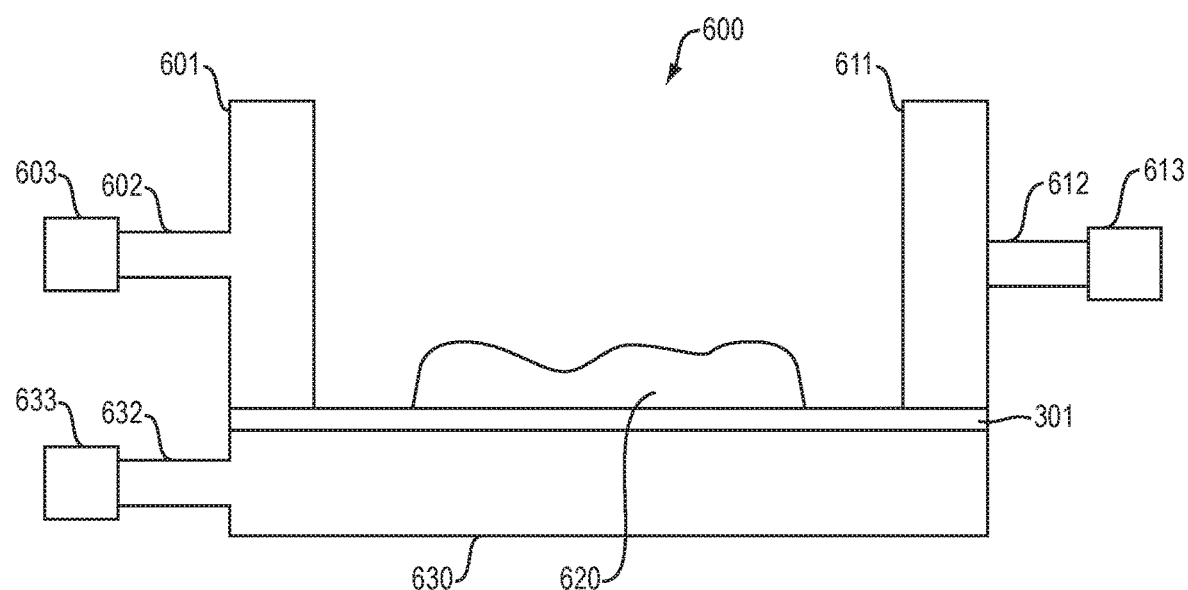
FIG. 6 is a cross-sectional view of an exit assembly.

In the example shown in FIG. 6, exit assembly 600 includes roller 630, wheels 601, 611, axles 602, 612, 632 and electric motors 603, 613, 633. Roller 630 and wheels 601, 611 may rotate and thereby impart linear motion to sheet 301 and to fabricated object 620 (which is attached to sheet 301). Thus, bottom roller 630 and wheels 601, 611 (which are each part of the exit assembly) may help pull or push sheet 301, causing sheet 301 to travel along a path through the fabrication system. Electric motors 603, 613, and 633 may, via axles 602, 612, and 632 respectively, actuate rotation of wheel 601, wheel 611 and roller 630 respectively.

Figure 7:
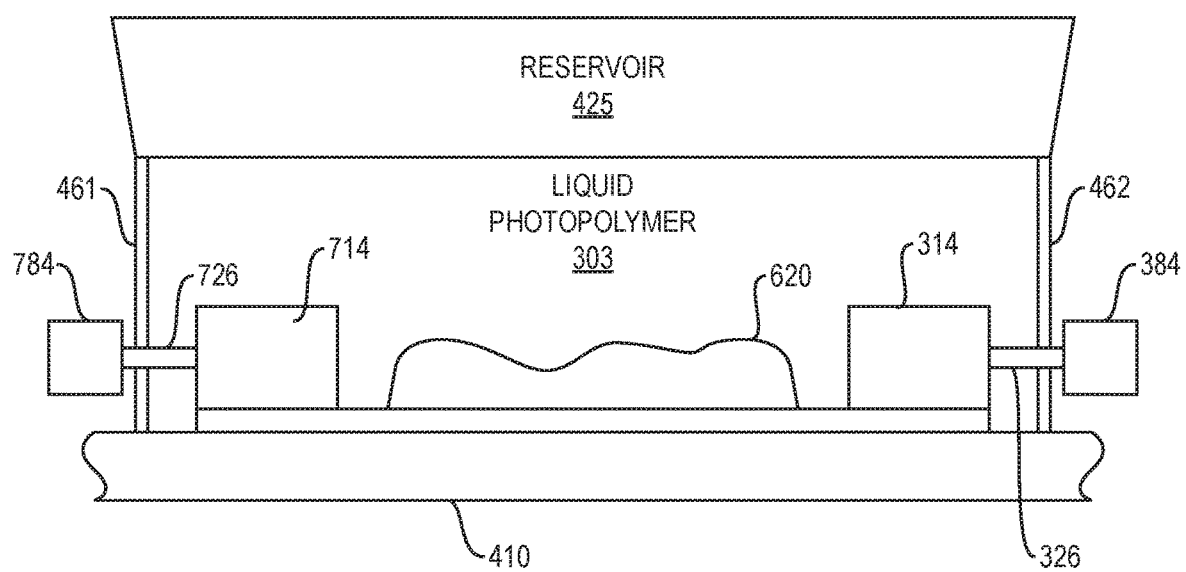
FIG. 7 shows a sheet being transported through a main vat.

FIG. 7 shows a sheet being transported through a main vat. In the example shown in FIG. 7: (a) the main vat includes walls 410, 461, 462; (b) the main vat contains, among other things, liquid photopolymer 303; (c) fabricated object 620 has been fabricated by curing photopolymer, as described above; (d) fabricated object 620 is attached to—thus is being transported along with—sheet 301; and (e) both sheet 301 and fabricated object 620 are immersed in—and being transported through—liquid photopolymer 303. In FIG. 7, electric motors 384, 784 impart rotary motion to axles 326, 726, respectively, which in turn causes wheels 314, 374 to rotate. This rotation may, in turn, impart linear motion to sheet 301.

FIG. 8 illustrates a main vat 800 and a resin leveling reservoir 425, in an exemplary embodiment of this invention.

In FIG. 8, a cross-section of main vat 800 is shown. Main vat 800 includes a bottom wall 410 and side walls 461, 462. (Side wall 461 is shown in FIG. 7, but not in FIG. 8). Main vat 800 contains liquid photopolymer. A DMD (digital micromirror device) projects light patterns onto an area 850 in the upper surface of the liquid photopolymer. Actuators (e.g., wheels 801, 802, 803, 804) may impart motion to sheet 301, causing sheet 301 to be fed through the main vat. The portion of sheet 301 that is moving through the main vat at any given time may rest on the bottom wall 410 of the main vat.

In some implementations, it is desirable to hold the vertical level of the liquid photopolymer in main vat 800 constant, in order to be able to project light patterns unto the liquid photopolymer while the upper surface of the liquid photopolymer is at a constant distance from the DMD (digital micromirror device). This may enable a lens of the DMD to both: (a) have a constant focal distance; and (b) to consistently focus a projected image onto the upper surface of the liquid photopolymer.

However, there is a problem: if corrective action is not taken, then liquid photopolymer may become depleted from the main vat (and the level of the liquid photopolymer in the main vat may fall) because: (a) liquid photopolymer in the main vat cures due to exposure to light, resulting in a solid fabricated object(s); and (b) the solid fabricated object(s) exit the main vat because they are attached to sheet 301 that is being fed through the main vat. The rate of depletion may be variable because the shape of the layers being fabricated (by curing the photopolymer) may vary from layer to layer.

In FIG. 8, reservoir 425 solves this problem, by maintaining a constant vertical level of liquid photopolymer in main vat 800. To achieve this: (a) liquid photopolymer is pumped, via tubes 811, 812, out of reservoir 425 into main vat 800; and (b) liquid photopolymer spills over a horizontal upper edge 860 of a wall, back into reservoir 425. For instance, the liquid photopolymer may spill back into reservoir 425 by moving along path 814. The upper edge of the wall (over which the photopolymer in the main vat spills) may be positioned at a desired vertical height, and the spilling may cause liquid photopolymer in the main vat to have an upper surface that is at the desired vertical height. In FIG. 8, the wall (over which liquid photopolymer spills back into reservoir 425) is part of reservoir 425. Alternatively, the wall (over which liquid photopolymer spills back into reservoir 425) may be part of the main vat.

In some cases, reservoir 425 maintains a constant vertical level of liquid photopolymer in main vat 800, even though the level of liquid photopolymer in reservoir 425 is not constant. For instance, in some cases, the vertical level of liquid photopolymer in main vat 800 remains constant—even while the vertical level of liquid polymer in reservoir 425 varies—as long as liquid photopolymer is pumped from reservoir 425 into main vat 800 at a sufficiently high rate to cause liquid photopolymer to simultaneously spill (over the upper edge of a wall) back into reservoir 425.

Figure 9:
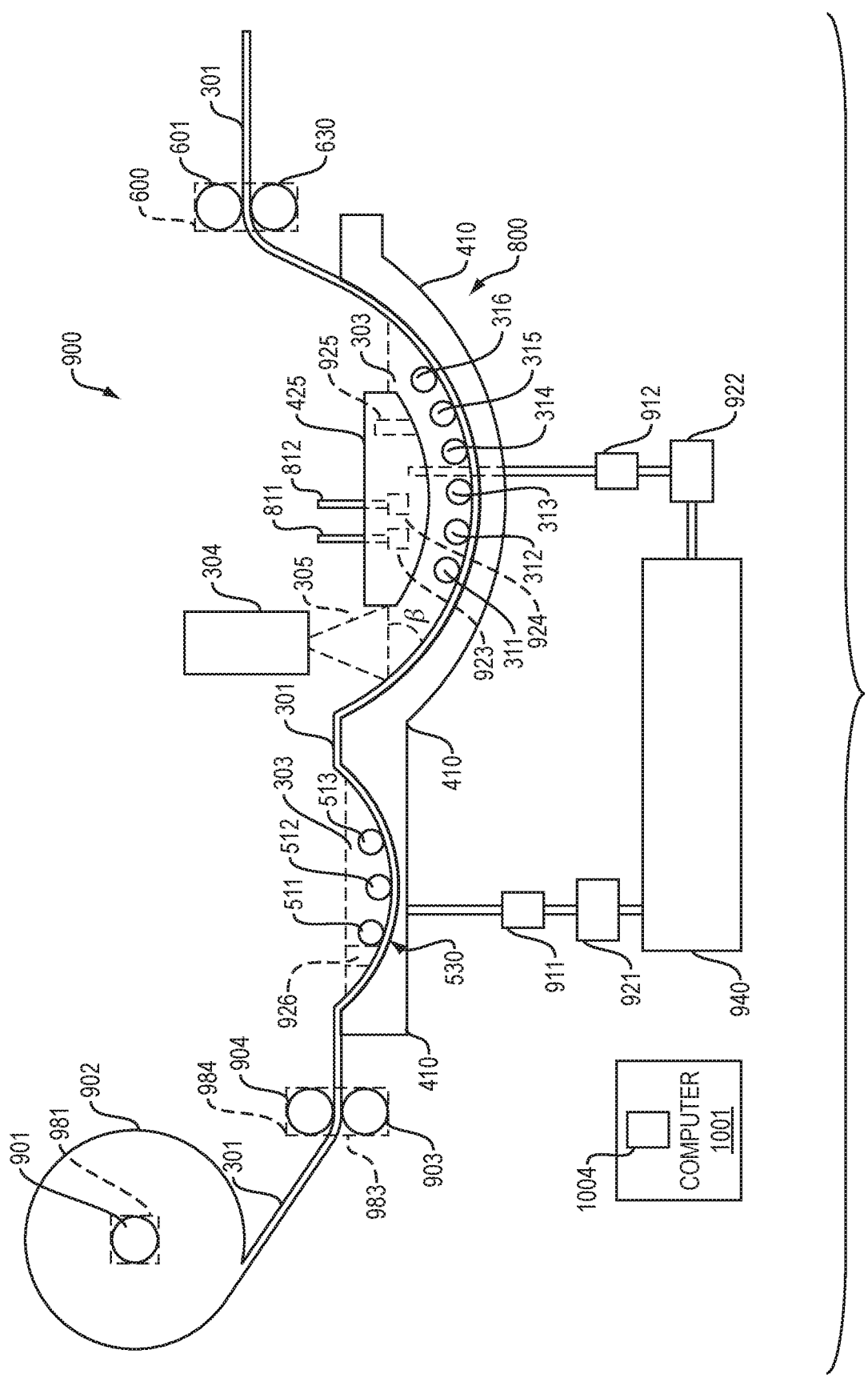
FIG. 9 is a cross-sectional view of a system for additive manufacturing.

FIG. 9 is a cross-sectional view of a system for additive manufacturing 900, in an illustrative implementation of this invention. Sheet 301 is stored (in rolled-up form) in roll 902. When system 900 is fabricating objects, sheet 301 is fed through the system, by exiting roll 902, then traveling through the fabrication system, and then traveling through exit assembly 600. While traveling through a path in the fabrication system, sheet 301 may (at any particular point in the path) always travel in the same direction. Alternatively, sheet 302 may move back-and-forth. In FIG. 9, the net effect of any back-and-forth motion is that sheet 301 is fed through the fabrication system, in such a way that portions of sheet 301 travel from roll 902, then through the fabrication system, and then through exit assembly 600.

In FIG. 9, a main reservoir 940 contains liquid photopolymer. Pump 921 pumps liquid photopolymer from main reservoir 940 to pre-processing vat 530, via one or more tubes or pipes. Pump 922 pumps liquid photopolymer from main reservoir 940 to reservoir 425, via one or more tubes or pipes. Valves 911 and 912 regulate this flow to vat 530 and reservoir 425, respectively. Pumps 923 and 924 pump liquid photopolymer from reservoir 425 up into tubes 811 and 812, respectively. Liquid photopolymer pours out of tubes 811 and 812 and down into main vat 800. Any type of pumps may be employed. For instance, pumps 921, 922, 923, 924 may each be any of the following: (a) a single-stage pump (with a single revolving impeller); (b) a multistage pump (with multiple revolving impellers); (c) a positive displacement pump (e.g., peristaltic pump, rotary lobe pump, progressive cavity pump, piston pump, diaphragm pump, screw pump, gear pump, hydraulic pump, rotary vane pump, or flexible impeller pump); (d) a centrifugal pump; or (e) a radial flow pump. The pumps may be driven by electric motors.

In FIG. 9, sensor modules 925 and 926 measure the amount of liquid photopolymer in reservoir 425 and pre-processing vat 530, respectively. For instance, one or more of sensor modules 925 and 926 (a) may include cameras that detect a level of liquid photopolymer (e.g., vertical height of an upper surface of the liquid photopolymer) or (b) may include pressure sensors that measure pressure caused by liquid photopolymer.

In FIG. 9, computer 1001 controls system 900. Computer 1001 may control digital micromirror device (DMD) 304. For instance, computer 900 may cause DMD 304 to project a temporal sequence of spatial light patterns unto liquid photopolymer in main vat 800, and may thereby control the shape of objects that are being fabricated by the system. Computer 1001 may receive feedback from sensors (e.g., sensor modules 925, 926) and, based on this feedback, may control pumping of liquid photopolymer: (a) from main reservoir 940 to preprocessing vat 530; (b) from main reservoir 920 to reservoir 425; and (c) from reservoir 425 to main vat 800. For instance, computer 1001 may control pumping by controlling pumps (e.g., 921, 922, 923, 924) and valves (e.g., 911, 912). Computer 1001 may control motion of sheet 301. For instance, computer 1001 may control motion of sheet 301 by controlling electric motors (e.g., 381, 382, 383, 384, 385, 386, 581, 582, 583, 603, 613, 633, 784, 981, 983, 984) that actuate movement of rollers and wheels that in turn actuate motion of sheet 301. Computer 1001 may store data in, and access data from, one or more memory devices 1003 (shown in FIG. 10). Computer 1001 may accept, via one or more I/O devices (e.g., 1002, shown in FIG. 10), input from a human user. For instance, this input from a user may comprise instructions or data. Also, computer 1001 may output, via these one or more I/O devices, data to a human user in a form (e.g., visual or audio) that is perceptible to the user. For instance, the one or more I/O (input/output) devices may include one or more of the following: keyboards, touch screens, microphones, computer screens, electronic display screens, speakers, projectors and haptic transducers. Computer 1001 may control a graphical user interface (GUI) that enables a human user to interact with computer 1001. The GUI may be produced by one or more of the I/O devices.

Figure 10:
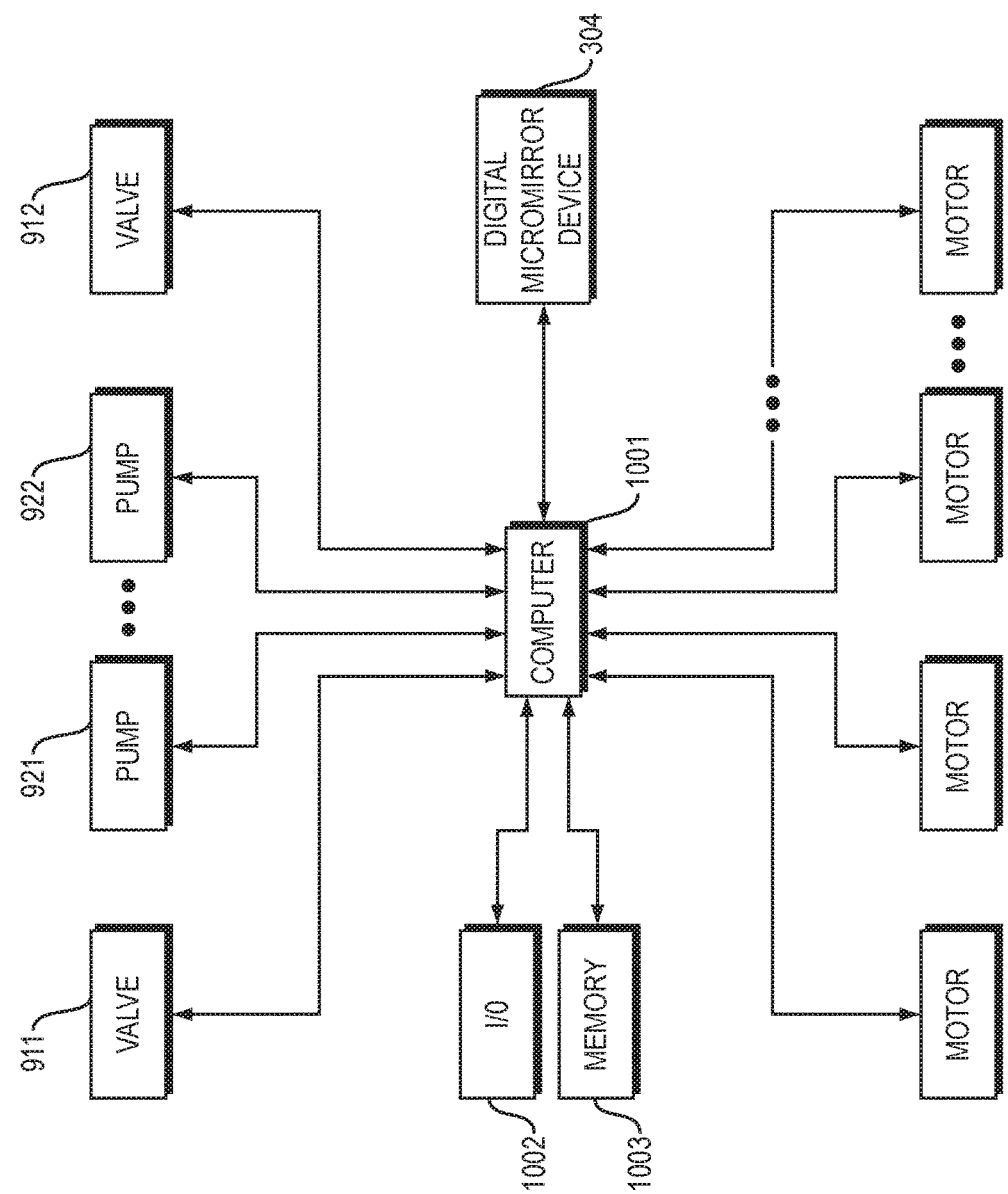
FIG. 10 is a block diagram of hardware in an additive manufacturing system.

FIG. 10 is a block diagram of hardware in an additive manufacturing system.

In some implementations, after a layer of liquid photopolymer adjacent to the upper surface of the liquid photopolymer is cured by exposure to light, sheet 301 moves, causing the newly cured layer (and the fabricated object of which it is a part) to move further down into a vat of liquid photopolymer. This in turn allows liquid photopolymer to flow back into a region above the newly cured layer, in preparation for the next light exposure that will cure the next layer.

In some cases, it is desirable to increase the rate at which liquid photopolymer flows back into the region above the newly cured layer. To increase the speed at which liquid photopolymer flows back into this region, sheet 301 may move back and forth. For instance, in a prototype of this invention: (a) a solid layer of polymer (which is 22 micrometers thick) is cured by projecting light unto an upper surface of a volume of liquid photopolymer; (b) the sheet (and object being fabricated, which is attached to it) moves down (at a slant) by a vertical distance equal to the vertical thickness of six layers (i.e., 132 micrometers); (c) this vertical displacement enables liquid photopolymer to quickly flow into a region above the object being fabricated; (d) then the sheet (and object being fabricated, which is attached to it) moves upward (at a slant) by a vertical distance equal to the vertical thickness of five layers (i.e., 110 micrometers); and (e) the net effect of these two movements of the sheet is that an upper surface of the object being fabricated is positioned 22 micrometers below the upper surface of the liquid photopolymer; and (e) then the next layer (which is 22 micrometers thick) is formed by projecting light unto the upper surface of the liquid photopolymer. The prototype described in the preceding sentence is a non-limiting example of this invention. This invention may be implemented in many other ways. Among other things, the thickness of layers may vary and the vertical distances traversed in the downward movement and the upward movement may vary.

Figure 11A:
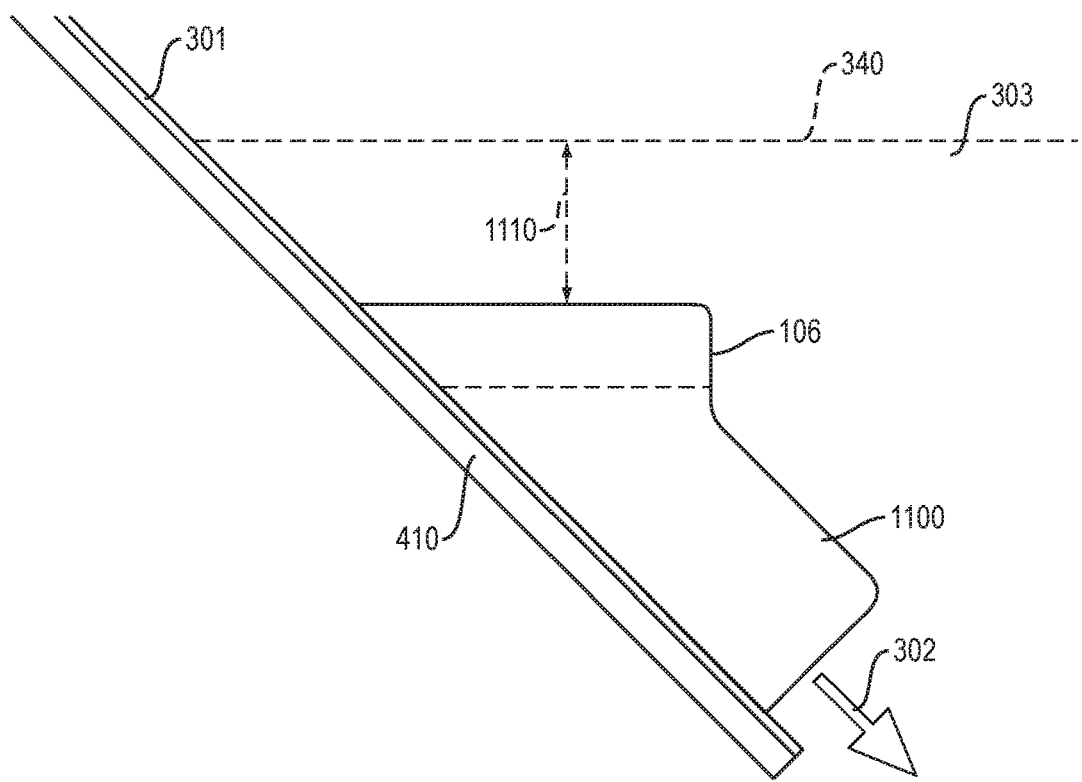
FIGS. 11A and 11B show back-and-forth motion of a movable sheet.
Figure 11B:
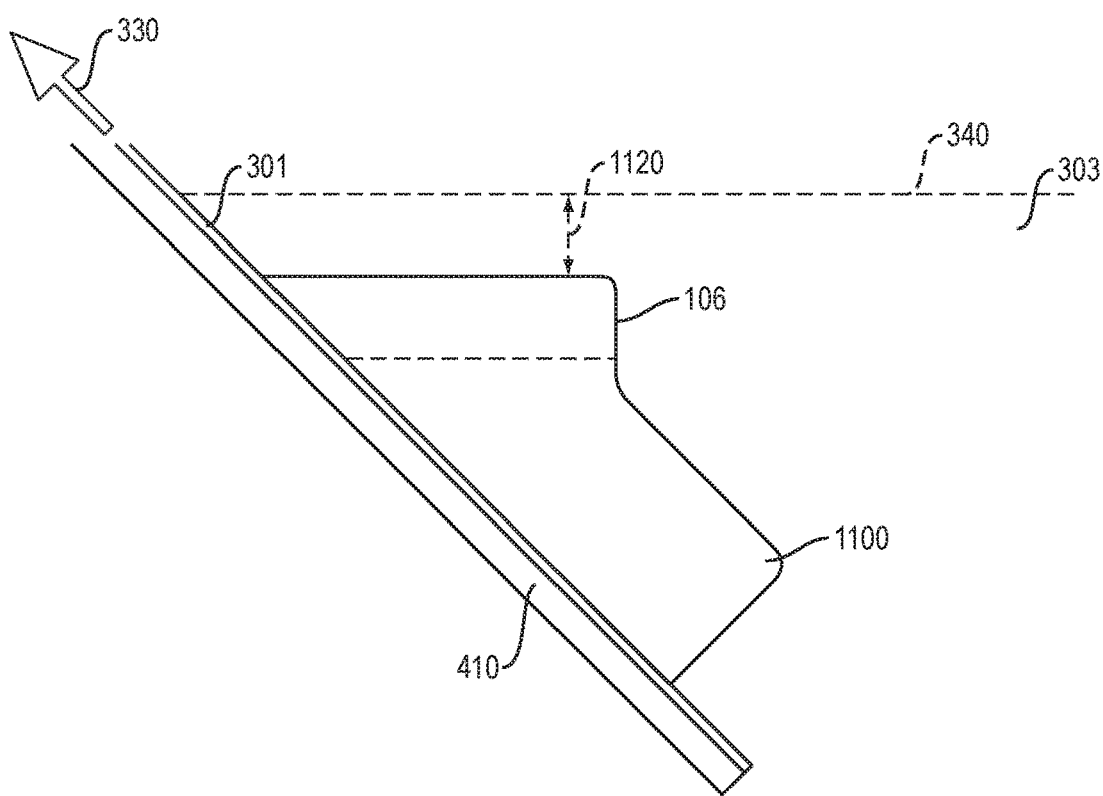

FIGS. 11A and 11B illustrate back-and-forth motion of sheet 301, to allow liquid photopolymer to quickly move back into a region above the object being fabricated.

In the example shown in FIG. 11A: (a) layer 106 has been formed (by curing photopolymer by exposure to light); (b) then sheet 301 (and object 1100, which is attached to sheet 301) have moved further down into a vat of liquid photopolymer, by moving in direction 302; (c) this motion has created a relatively large vertical gap between the upper surface 340 of the liquid photopolymer and object 1100; and (d) this relatively large gap enables the liquid photopolymer to flow back quickly into the gap and to cover object 1100 quickly.

After the liquid photopolymer has covered the object being fabricated, the object may be raised upward to a position near the upper surface of the liquid photopolymer, in preparation for the next light exposure that will cure the next layer.

The example shown in FIG. 11B occurs after that shown in FIG. 11A. In FIG. 11B: (a) liquid photopolymer has again covered the upper surface of object 1100; (b) sheet 301 (and object 1100, which is attached to sheet 301) have then moved upward, by moving in direction 330; (c) this motion has reduced the vertical gap between the upper surface 340 of the liquid photopolymer and object 1100; and (d) the resulting, relatively small vertical gap is approximately equal to the vertical thickness of the next layer that will be formed by photocuring.

In FIG. 11A, the relatively large vertical gap (between surface 340 and object 1100) has vertical distance 1110. In FIG. 11B, the relatively small vertical gap (between surface 340 and object 1100) has vertical distance 1120. Distance 1110 is greater than distance 1120.

In illustrative implementations, sheet 301 is much longer than the total length of the rest of the fabrication system.

In some implementations, the fact that sheet 301 is so long enables multiple steps in a fabrication process to occur simultaneously, in a manner similar to a conventional assembly line. The object(s) being fabricated may be attached to sheet 301 and may be transported by sheet 301 to different parts of fabrication system that simultaneously perform different steps in the fabrication process. In some cases, at a particular time: (a) multiple objects are attached to, and are being transported by, sheet 301; and (b) each of the multiple objects is undergoing a different stage in a fabrication process. In other cases, at a particular time: (a) a long object is attached to, and is being transported by, sheet 301; and (b) different portions of the long object are undergoing different stages in a fabrication process.

Figure 12:
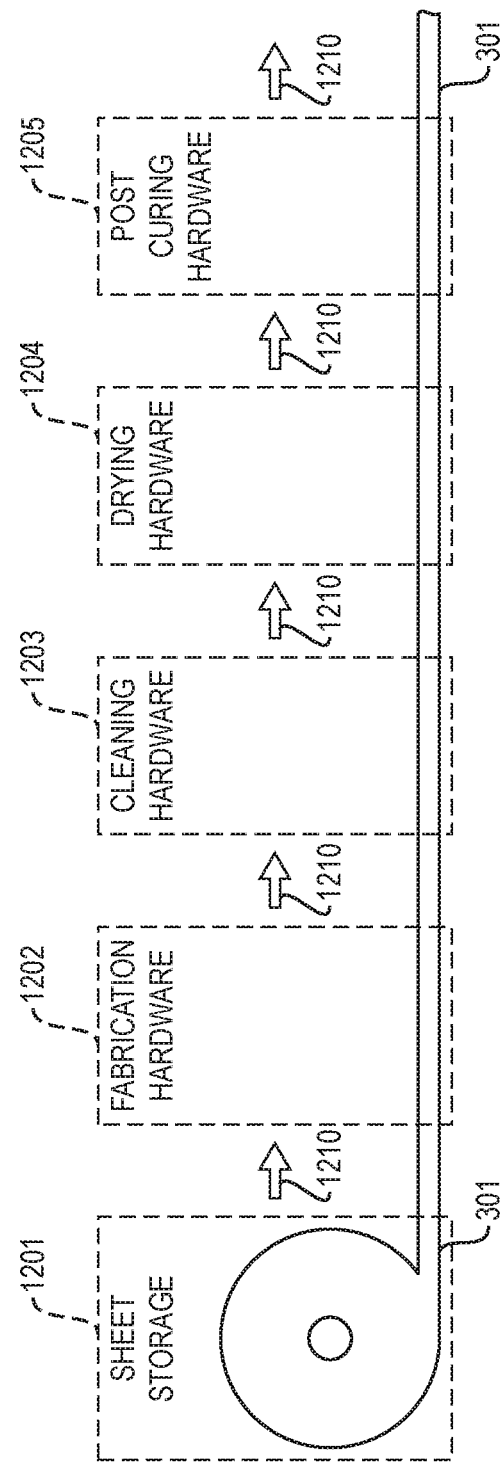
FIG. 12 illustrates multiple steps in a fabrication process occurring simultaneously.

FIG. 12 illustrates multiple steps in a fabrication process occurring simultaneously, while sheet 301 is being fed through a fabrication system and is transporting objects that are attached to sheet 301. In the example shown in FIG. 12, sheet 301 is being fed through a fabrication system in direction 1210. This motion may either be constantly in direction 1210 or may instead be back-and-forth motion that has the net effect of moving in direction 1210. In FIG. 12, in some use scenarios, each of the following steps occur simultaneously: (a) a first object is fabricated by fabrication hardware 1202; (b) a second object is cleaned by cleaning hardware 1203; (c) a third object is dried by drying hardware 1204; and (d) a fourth object undergoes post-processing by post-processing hardware 1205. Alternatively, in some use scenarios, each of the following steps occur simultaneously: (a) a first portion of a long object is fabricated by fabrication hardware 1202; (b) a second portion of the long object is cleaned by cleaning hardware 1203; (c) a third portion of the long object is dried by drying hardware 1204; and (d) a fourth portion of the long object undergoes post-processing by post-processing hardware 1205.

In FIG. 12, sheet 301 is stored in sheet storage 1201 before it is fed into the fabrication system.

In some implementations of this invention, a portion of sheet 301 is immersed in a liquid, while a solid is formed by curing. For instance, in some cases, a portion of sheet 301 is immersed in liquid photopolymer, while a solid polymer is formed by exposing liquid photopolymer to light projected by DMD 304.

In some use scenarios, each of the following occur simultaneously: (a) a first portion of sheet 301 is immersed in liquid photopolymer in preprocessing vat 530; (b) a second portion of sheet 301 is immersed in liquid photopolymer in main vat 800; and (c) a solid polymer is formed by exposing liquid photopolymer in main vat 800 to light projected by DMD 304.

In some implementations of this invention, sheet 301 is permanently attached to, and is included in, the final object that is fabricated. In some cases, this permanent attachment is achieved by soaking or coating sheet 301 with liquid photopolymer 303 in preprocessing vat 530, then projecting light onto region 450 at an edge of the liquid photopolymer in main vat 800, and then curing in such a way that each solid layer produced by the curing is attached (e.g., by chemical or mechanical bonds) to the build substrate and thus indirectly to sheet 301.

In other implementations, sheet 301 is a sacrificial material that is removed from the object being fabricated, after the object is formed by additive manufacturing. For instance, after the object is formed, sheet 301 may be removed from the object by mechanical abrasion or chemical reactions (e.g., dissolution).

In yet other implementations, sheet 301 is detached from the object being fabricated, and then is reused. For instance, after sheet 301 is removed from the object being fabricated, sheet 301 may be cleaned and then rolled into a roll. This roll of sheet 301 may then reused, by being fed through the fabrication system again.

In yet other implementations, sheet 301 forms a loop that moves around a path continuously, similar to a conveyor belt or tank track.

In many implementations: (a) sheet 301 does not form a loop; and (b) two ends of sheet 301 (at opposite ends of the sheet's longitudinal axis) do not touch each other.

In some implementations of this invention: (a) a digital micromirror device (DMD) is part of a fabrication system: and (b) portions of the DMD are, at all times during fabrication by the system, in a fixed position relative to other components of the system. For instance, in some cases, the portions of a DMD (e.g., 304) that are in a fixed position may include: (a) a lens of the DMD; (b) an active light source of the DMD, such as one or more white lamps, xenon arc lamps, lasers or LEDs (light emitting diodes); (c) a substrate of an integrated chip of the DMD (e.g., a substrate which is an alloy that includes silicon); and (d) a housing of the DMD. In some cases, each of the portions of the DMD that are mentioned in the preceding sentence may, at all times during additive manufacturing of an object by the fabrication system, be in a fixed position relative to one or more of the following parts of (or locations in) the fabrication system: (a) walls of a container (e.g., main vat 800, preprocessing reservoir 530, and reservoir 425) that contains uncured resin or uncured photopolymer; (b) tubing or a pipe that is fluidically connected to, and that provides a channel by which liquid travels to, such a container; (c) a geometric axis about which an actuator rotates, while actuating motion of a movable sheet (e.g., 301); and (d) a spatial path along which a sheet (e.g., 301) travels.

As noted above, a portion of sheet 301 may descend, step by step, while DMD 304 projects a temporal sequence of images to cure a photopolymer. However, this invention is not limited to sheet 301 descending.

In some cases, a portion of sheet 301 may ascend, step by step, while DMD 304 projects a temporal sequence of images to cure layers of photopolymer. In this alternative approach, after each new solid layer of polymer is formed, a portion of sheet 301 that is attached to the new layer may move upward, causing the new layer (and the entire object being fabricated) to be raised by a vertical distance equal to the vertical thickness of the new layer. This may cause a portion of the new layer to be lifted to a position that is vertically higher than the upper surface 340 of the liquid photopolymer. However, at least a bottom portion of the new layer may remain below the upper surface of the liquid photopolymer. This may ensure that this bottom portion of the new layer attaches to the next layer when the next layer is cured. In this alternative approach, multiple layers of an object may, during fabrication of the object, be vertically higher than the upper surface 340 of the liquid photopolymer in main vat 800. In this alternative approach, DMD 304 may be positioned below, or to the side of, the liquid photopolymer. Thus, DMD 304 may project light unto the liquid photopolymer from below, or from the side of, the liquid photopolymer. In this alternative approach, sheet 301 may move upward, by moving in direction 330 along a path that is at an acute angle (e.g., angle β) relative to the upper surface 340 of liquid photopolymer 303 (see FIG. 4A, which shows direction 330 and angle β).

More Detail

In some implementations of this invention, an additive manufacturing system may continuously produce a three-dimensional (3D) structure on a roll of fabric. The system may include a specially designed vat that contains liquid resin, a 405 nm wavelength Digital Light Processing® (DLP®) projector, a series of rollers, two driving motors and a roll of nylon fabric. The motors may continuously move the fabric from one end of the system to another. As the fabric passes through the resin vat, the DLP® projector may project a sequence of images that solidify the liquid resin. By doing so, the system may achieve non-stop additive manufacturing, over the entire length of the fabric roll (e.g., 100-200 meters).

In some implementations of this invention, prints that are produced may be fixed on a continuously running fabric, and thus may be directly fed to a cleaning module, drying module and the post curing module. This may eliminate manual intervention, and may thereby improve the printing quality.

In some implementations of this invention, the fabrication system may employ a slicing program that generates layers of bitmaps for 3D printing. In this slicing program, structures may be represented by lines instead of a mesh. The slicing program may create bitmaps with coordinates of lines. This may reduce processing time and file sizes (e.g., at least 1000× times, depending on the geometry of the object). With this software support, one may smoothly design and manufacture dense structures on large surfaces. For instance, this slicing program may employ lines to represent dense arrays (e.g., dense arrays of micropillars, hairs or microlattices), with far less data than would be required with a conventional mesh file (e.g., an .stl file).

In some implementations of this invention, 3D structures are formed on a roll of nylon fabric. The fabric may go into the liquid resin level with an angle of q. A DLP® (Digital Light Processing®) projector may be precisely positioned, in such a way that one edge of the projection lies 200 to 400 micrometers before the resin-fabric intersection area. Thus, in some cases, there may be 200 to 400 micrometers projection area on the fabric, instead of the resin level. The resin-fabric intersection area may be where the first layer of a build will form. For each layer, the fabric may roll into the resin, and the projection may change according to the corresponding bitmaps to form solid structures.

In some implementations of this invention, a 3D structure is sliced with the same angle of q, so that the model may be correctly printed. The width of a print may be limited by the width of the projection area. The height of a print (h_print) may depend on the height of the projection area (h_projection) and angle q. Specifically, in some cases, h_print=sin (q)×h_projection In some implementations of this invention, the length of the print may be unlimited as long as the fabric still feeds into the resin.

In some implementations of this invention, two stepper motors control the movement and tension of the fabric. These two motors may be located at the two ends of the system. Each motor may be connected to a rubber roller. The fabric may be set up as follows: the fabric may go through the first roller, which may be connected to the first motor, and several assisting rollers. After that, the fabric may go into the resin vat. The fabric may then go through the second roller, which may be connected to the second motor. After that, the fabric may go to cleaning, drying and post curing modules. During printing, the two motors may synchronize their movement. To print one layer, the first motor may pull the fabric backward for a certain number of steps n, while the second motor pushes the fabric with the same steps. The projector may display the corresponding bitmaps for a time length of t1. After that, the projector may display a black image for a time length of t2, during which, the first motor may push the fabric forward for n+m steps while the second motor pulls the fabric with the same steps. The step n may determine the thickness of the build layer. The step m may be varied depending on the viscosity of the printing resin.

In some implementations of this invention, a resin vat assists the printing process. The vat may have a "U" shape, where the fabric is fed in from one end, and pulled out from the other with the built structures on it. Inside the vat, there may be a flat surface that is collocated with the projection area. The angle between the surface and the resin level may be the same as angle q (discussed above). The fabric may lay directly on this surface during printing. This may allow the 3D structure to be accurately printed (built). The vat may also have assisting rollers on two inner sides of the vat, to smoothen the movement of the fabric. The number of assisting rollers may be varied based on the type of the fabric.

In some implementations of this invention, as the printed structure moves out of the resin level from the end of the U-shape resin vat, the level of the resin may drop. This may (unless corrected) cause inaccurate printing, as the focus distance of the projection has increased. A resin leveling system may be employed to correct this problem. A U-shape reservoir that contains the same resin may be inserted in the resin vat. The reservoir may be smaller so that it does not collide with the movement of the printed structure. Two of the edges of the reservoir may be lower, so that they are on the same level of the resin in the vat. A peristaltic pump may constantly move the resin from the reservoir to the vat. As the resin level increases, the resin may flow into the reservoir again. This allows the level of the resin in the vat to remain constant.

In some implementations of this invention, a pre-curing mechanism is employed. The pre-curing mechanism may comprise a mechanical configuration and software setup. The fabric may go through a smaller resin vat after the first roller. By doing so, the fabric may be soaked with liquid resin before it enters the resin vat. The projection area may cover some fabric area before the first layer. A script may generate a white color line on every bitmap at that area. By doing so, the fabric may be fused with cured resin, before the actual first layer. This may improve the adhesion between the fabric and the print structure.

In some implementations of this invention, the system may print a virtually unlimited length of a structure. A slicing method may be employed, which may facilitate fabrication of dense and fine geometries. In this slicing method, a software program may take two coordinates of a line and find the intersection with the slicing plane. After that, a rasterization process may assign white pixels at that intersection. This may allow a computer to quickly process dense and fine structures such as microlattices, micropillars, etc. This slicing method may allow the fabrication system to handle very large print volumes. In contrast, a conventional mesh-based slicing program may not be able to handle a large print volume because it does not support a super-large mesh file.

Computers

In illustrative implementations of this invention, one or more computers (e.g., servers, network hosts, client computers, integrated circuits, microcontrollers, controllers, field-programmable-gate arrays, personal computers, digital computers, driver circuits, or analog computers) are programmed or specially adapted to perform one or more of the following tasks: (1) to control the operation of, or interface with, hardware components of a fabrication system, including a digital micromirror device (DMD), motors, pumps, valves, and sensors; (2) to create or access a digital representation of an object to be fabricated and, based on this digital representation, to control shapes of spatial light patterns projected by a DMD, in order to fabricate the object by photocuring; (3) to control motion of a movable sheet and to synchronize this motion with projected light images, by controlling timing of steps taken by stepper motors and timing of images projected by a DMD; (4) to receive data from, control, or interface with one or more sensors; (5) to perform any other calculation, computation, program, algorithm, or computer function described or implied herein; (6) to receive signals indicative of human input; (7) to output signals for controlling transducers for outputting information in human perceivable format; (8) to process data, to perform computations, and to execute any algorithm or software; and (9) to control the read or write of data to and from memory devices (tasks 1-9 of this sentence being referred to herein as the "Computer Tasks"). The one or more computers (e.g., 1001) may, in some cases, communicate with each other or with other devices: (a) wirelessly, (b) by wired connection, (c) by fiber-optic link, or (d) by a combination of wired, wireless or fiber optic links.

In exemplary implementations, one or more computers are programmed to perform any and all calculations, computations, programs, algorithms, computer functions and computer tasks described or implied herein. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium may comprise a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory, computer-readable media. For example, in some cases, these instructions comprise instructions for a computer to perform any calculation, computation, program, algorithm, or computer function described or implied herein. For instance, in some cases, instructions encoded in a tangible, non-transitory, computer-accessible medium comprise instructions for a computer to perform the Computer Tasks.

Network Communication

In illustrative implementations of this invention, electronic devices in a fabrication system are each configured for wireless or wired communication with other devices in a network.

For example, in some cases, one or more of these electronic devices each include a wireless module for wireless communication with other devices in a network. Each wireless module (e.g., 1004) may include (a) one or more antennas, (b) one or more wireless transceivers, transmitters or receivers, and (c) signal processing circuitry. Each wireless module may receive and transmit data in accordance with one or more wireless standards.

In some cases, one or more of the following hardware components are used for network communication: a computer bus, a computer port, network connection, network interface device, host adapter, wireless module, wireless card, signal processor, modem, router, cables or wiring.

In some cases, one or more computers (e.g., 1001) are programmed for communication over a network. For example, in some cases, one or more computers are programmed for network communication: (a) in accordance with the Internet Protocol Suite, or (b) in accordance with any other industry standard for communication, including any USB standard, ethernet standard (e.g., IEEE 802.3), token ring standard (e.g., IEEE 802.5), or wireless communication standard, including IEEE 802.11 (Wi-Fi®), IEEE 802.15 (Bluetooth®/Zigbee®), IEEE 802.16, IEEE 802.20, GSM (global system for mobile communications), UMTS (universal mobile telecommunication system), CDMA (code division multiple access, including IS-95, IS-2000, and WCDMA), LTE (long term evolution), or 5G (e.g., ITU IMT-2020).

Actuators

In illustrative implementations, the fabrication system includes one or more actuators (e.g., 311, 312, 313, 314, 315, 316, 511, 512, 513, 601, 611, 630, 714, 801, 802, 803, 804, 901, 903, 904). Each actuator (including each actuator for actuating any movement) may be any kind of actuator, including a linear, rotary, electrical, piezoelectric, electro-active polymer, mechanical or electro-mechanical actuator. In some cases, the actuator includes and is powered by an electrical motor, including any stepper motor or servomotor. In some cases, the actuator includes a gear assembly, drive train, pivot, joint, rod, arm, or other component for transmitting motion. In some cases, one or more sensors are used to detect position, displacement or other data for feedback to one of more of the actuators.

Definitions

The terms "a" and "an", when modifying a noun, do not imply that only one of the noun exists. For example, a statement that "an apple is hanging from a branch": (i) does not imply that only one apple is hanging from the branch; (ii) is true if one apple is hanging from the branch; and (iii) is true if multiple apples are hanging from the branch.

To "actuate" a motion means to directly or indirectly actuate the motion. For instance, a non-limiting example of a motor actuating motion of a sheet is the motor actuating rotation of a wheel, which rotation actuates motion of the sheet.

Unless the context clearly indicates otherwise, "attached" means physically attached by a direct or indirect physical attachment. For instance, a non-limiting example of a sheet being "attached" to a solid layer is the sheet being physically attached to a build substrate which is physically attached to the solid layer.

To compute "based on" specified data means to perform a computation that takes the specified data as an input.

The term "comprise" (and grammatical variations thereof) shall be construed as if followed by "without limitation". If A comprises B, then A includes B and may include other things.

A digital computer is a non-limiting example of a "computer". An analog computer is a non-limiting example of a "computer". A computer that performs both analog and digital computations is a non-limiting example of a "computer". However, a human is not a "computer", as that term is used herein.

"Computer Tasks" is defined above.

"Defined Term" means a term or phrase that is set forth in quotation marks in this Definitions section.

"Digital micromirror device" or "DMD" means a spatial light modulator (SLM) that: (a) includes an array of mirrors; and (b) controls a spatial pattern of light projected by the SLM, by controlling orientation of mirrors in the array of mirrors.

For an event to occur "during" a time period, it is not necessary that the event occur throughout the entire time period. For example, an event that occurs during only a portion of a given time period occurs "during" the given time period.

The term "e.g." means for example.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each may be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

"For instance" means for example.

To say a "given" X is simply a way of identifying the X, such that the X may be referred to later with specificity. To say a "given" X does not create any implication regarding X. For example, to say a "given" X does not create any implication that X is a gift, assumption, or known fact.

As used herein, the "height", "width" and "length" of a physical object are measured along three coordinate axes that are perpendicular to each other. The orientation of these three coordinate axes relative to a point external to the physical object may vary (e.g., as the object rotates or translates relative to the external point), without affecting the "height", "width" and "length" of the object.

"Herein" means in this document, including text, specification, claims, abstract, and drawings.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

"Light" means electromagnetic radiation of any frequency. For example, "light" includes, among other things, visible light and infrared light. Likewise, any term that directly or indirectly relates to light (e.g., "imaging ") shall be construed broadly as applying to electromagnetic radiation of any frequency.

"Net movement" or "net motion" means movements that have the net effect of traveling in a particular direction.

Unless the context clearly indicates otherwise, "or" means and/or. For example, A or B is true if A is true, or B is true, or both A and B are true. Also, for example, a calculation of A or B means a calculation of A, or a calculation of B, or a calculation of A and B.

A parenthesis is simply to make text easier to read, by indicating a grouping of words. A parenthesis does not mean that the parenthetical material is optional or may be ignored.

As used herein, the term "set" does not include a group with no elements.

Unless the context clearly indicates otherwise, "some" means one or more.

As used herein, a "subset" of a set consists of less than all of the elements of the set.

The term "such as" means for example.

To say that a machine-readable medium is "transitory" means that the medium is a transitory signal, such as an electromagnetic wave.

"Ultraviolet range" means from the range of wavelengths that is greater than or equal to 10 nanometers and less than 400 nanometers.

"Vat" means a container that is configured to contain a liquid. In some cases, a "vat" has an open top, which exposes the liquid to air. In some cases, a "vat" has one or more openings through which liquid flows into or out of the vat.

"Vertical distance" means distance in a vertical direction.

"Visible light range" means the range of wavelengths that is greater than or equal to 400 nanometers and less than 700 nanometers.

Except to the extent that the context clearly requires otherwise, if steps in a method are described herein, then the method includes variations in which: (1) steps in the method occur in any order or sequence, including any order or sequence different than that described herein; (2) any step or steps in the method occur more than once; (3) any two steps occur the same number of times or a different number of times during the method; (4) any combination of steps in the method is done in parallel or serially; (5) any step in the method is performed iteratively; (6) a given step in the method is applied to the same thing each time that the given step occurs or is applied to a different thing each time that the given step occurs; (7) one or more steps occur simultaneously; or (8) the method includes other steps, in addition to the steps described herein.

Headings are included herein merely to facilitate a reader's navigation of this document. A heading for a section does not affect the meaning or scope of that section.

This Definitions section shall, in all cases, control over and override any other definition of the Defined Terms. The Applicant or Applicants are acting as his, her, its or their own lexicographer with respect to the Defined Terms. For example, the definitions of Defined Terms set forth in this Definitions section override common usage and any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. Unless the context clearly indicates otherwise, any definition or clarification herein of a term or phrase applies to any grammatical variation of the term or phrase, taking into account the difference in grammatical form. For example, the grammatical variations include noun, verb, participle, adjective, and possessive forms, and different declensions, and different tenses.

Variations

This invention may be implemented in many different ways. Here are some non-limiting examples:

In some implementations, this invention is a method comprising: (a) moving a sheet in such a way that a first portion of the sheet enters and then exits a first vat that contains liquid photopolymer; and (b) performing photocuring while the first portion of the sheet is at least partially immersed in the liquid photopolymer, which photocuring comprises forming solid layers of polymer by projecting a temporal sequence of spatial light patterns unto the liquid photopolymer, in such a way that each spatial light pattern in the sequence causes a portion of the liquid photopolymer to solidify into one the solid layers; wherein (i) the solid layers together constitute a first solid object, (ii) the photocuring causes one or more of the solid layers to be attached to the sheet, and (iii) the moving of the sheet actuates motion of the first solid object and thus causes the first solid object to exit the first vat. In some cases, the sheet has a length, width and height, the length of the sheet being (a) at least fifty times greater than the width of the sheet and (b) at least one hundred times greater than the height of the sheet. In some cases: (a) the sheet moves in a path through a fabrication system; (b) the fabrication system has a build volume; and (c) the build volume has a length, width and height, the length of the build volume being (i) at least fifty times greater than the width of the build volume and (ii) at least one hundred times greater than the height of the build volume. In some cases: (a) during the photocuring, a planar surface of the first portion of the sheet touches, and is at an angle relative to, an upper surface of the liquid photopolymer; and (b) the angle is greater than ten degrees and less than eighty degrees. In some cases: (a) electric motors actuate rotation of wheels or rollers; and (b) the rotation of the wheels or rollers actuates the moving of the sheet. In some cases: (a) a digital micromirror device (DMD) performs the projecting; (b) the DMD includes a lens; and (c) at all times during the photocuring, the lens is stationary relative to one or more walls of the vat. In some cases, the method further comprises pre-processing steps that occur before the first portion of the sheet enters the liquid photopolymer in the first vat, which pre-processing steps comprise: (a) soaking or coating the first portion of the sheet with additional liquid photopolymer in a second vat; (b) moving the first portion of the sheet from the second vat toward the first vat; and (c) forming a build substrate, by photocuring the additional liquid photopolymer which has soaked or coated the first portion of the sheet. In some cases: (a) a specific solid layer is one of the solid layers; and (b) the moving includes (i) after the specific solid layer solidifies, moving the sheet downward in the first vat by a first vertical distance, which first vertical distance has an absolute value that is greater than or equal to twice the absolute value of the vertical thickness of the specific solid layer, and (ii) then, after liquid photopolymer entirely covers the solid object, moving the sheet upward in the first vat by a second vertical distance, the absolute value of the second vertical distance being less than the absolute value of the first vertical distance. In some cases, the moving of the sheet simultaneously actuates motion of not only the first solid object but also other solid objects, which other solid objects are separate from the first solid object and have been formed by photocuring of liquid photopolymer in the first vat. In some cases, the sheet remains attached to, and is part of, the first solid physical object even after fabrication of the object is complete. In some cases: (a) the method further comprises removing the sheet from the first solid object; and (b) the removing is performed by mechanical abrasion or by one or more chemical reactions. In some cases, the method further comprises re-using the sheet, by moving the sheet in such a way that the first portion of the sheet repeatedly enters and then exits the first vat. In some cases, the sheet comprises a loop. Each of the cases described above in this paragraph is an example of the method described in the first sentence of this paragraph, and is also an example of an embodiment of this invention that may be combined with other embodiments of this invention.

In some implementations, this invention is a system comprising: (a) a sheet; (b) a first vat; (c) a digital micromirror device (DMD); and (d) actuators; wherein (i) the actuators are configured to actuate motion of the sheet in such a way that a first portion of the sheet enters and then exits the first vat, while the first vat contains liquid photopolymer, and (ii) the DMD is configured to fabricate solid layers of a first solid object, by projecting a temporal sequence of spatial light patterns unto the liquid photopolymer in the first vat, in such a way that each spatial light pattern in the sequence causes a portion of the liquid photopolymer to solidify into one the solid layers. In some cases, the sheet has a length, width and height, the length of the sheet being (a) at least fifty times greater than the width of the sheet and (b) at least one hundred times greater than the height of the sheet. In some cases, the first vat and the sheet are configured in such a way that: (a) during the photocuring, a planar surface of the first portion of the sheet touches, and is at an angle relative to, an upper surface of the liquid photopolymer; and (b) the angle is greater than ten degrees and less than eighty degrees. In some cases: (a) the actuators comprise (i) electric motors and (ii) wheels or rollers; and (b) the electric motors are configured to actuate rotation of the wheels or rollers, which rotation in turn actuates the motion of the sheet. In some cases: (a) the DMD includes a lens; and (b) the lens is stationary relative to one or more walls of the vat, at all times during the projecting. In some cases: (a) the system further comprises a second vat; (b) the actuators are configured to actuate the motion of the sheet, in such a way that the first portion of sheet enters the second vat, then is soaked or coated with additional liquid photopolymer that is in the second vat, then exits the second vat, and then travels toward the first vat; and (c) the DMD is configured to fabricate a build substrate, by projecting light to photocure the additional liquid photopolymer which has soaked or coated the first portion of the sheet, in such a way that the build substrate is fabricated before the first portion of the sheet enters the liquid photopolymer that is in the first vat. In some cases: (a) a specific solid layer is one of the solid layers; and (b) the actuators are configured to actuate the motion of the sheet in such a way that (i) after the specific solid layer solidifies, the sheet moves downward in the first vat by a first vertical distance, which first vertical distance has an absolute value that is greater than or equal to twice the absolute value of the vertical thickness of the specific solid layer, and (ii) then, after liquid photopolymer entirely covers the solid object, the sheet moves upward in the first vat by a second vertical distance, the absolute value of the second vertical distance being less than the absolute value of the first vertical distance. Each of the cases described above in this paragraph is an example of the system described in the first sentence of this paragraph, and is also an example of an embodiment of this invention that may be combined with other embodiments of this invention.

Each description herein (or in the Provisional) of any method, apparatus or system of this invention describes a non-limiting example of this invention. This invention is not limited to those examples, and may be implemented in other ways.

Each description herein (or in the Provisional) of any prototype of this invention describes a non-limiting example of this invention. This invention is not limited to those examples, and may be implemented in other ways.

Each description herein (or in the Provisional) of any implementation, embodiment or case of this invention (or any use scenario for this invention) describes a non-limiting example of this invention. This invention is not limited to those examples, and may be implemented in other ways.

Each Figure, diagram, schematic or drawing herein (or in the Provisional) that illustrates any feature of this invention shows a non-limiting example of this invention. This invention is not limited to those examples, and may be implemented in other ways.

The above description (including without limitation any attached drawings and figures) describes illustrative implementations of the invention. However, the invention may be implemented in other ways. The methods and apparatus which are described herein are merely illustrative applications of the principles of the invention. Other arrangements, methods, modifications, and substitutions by one of ordinary skill in the art are also within the scope of the present invention. Numerous modifications may be made by those skilled in the art without departing from the scope of the invention. Also, this invention includes without limitation each combination and permutation of one or more of the items (including any hardware, hardware components, methods, processes, steps, software, algorithms, features, and technology) that are described herein.

What is claimed:

1. A method comprising:
   (a) moving a sheet in such a way that (I) a first portion of the sheet enters and then exits a first vat that contains liquid photopolymer and (II) the moving is actuated by actuators and is controlled by one or more computers that control the actuators ; and
   (b) performing photocuring while the first portion of the sheet is at least partially immersed in the liquid photopolymer, which photocuring comprises forming solid layers of polymer by projecting a temporal sequence of spatial light patterns unto the liquid photopolymer, in such a way that each spatial light pattern in the sequence causes a portion of the liquid photopolymer to solidify into one of the solid layers; wherein (i) the solid layers together constitute a first solid object,
(ii) the photocuring causes one or more of the solid layers to be attached to the sheet, and
(iii) the moving of the sheet actuates motion of the first solid object and thus causes the first solid object to exit the first vat.

2. The method of claim 1, wherein the sheet has a length, width and height, the length of the sheet being (a) at least fifty times greater than the width of the sheet and (b) at least one hundred times greater than the height of the sheet.

3. The method of claim 1, wherein:
(a) the sheet moves in a path through a fabrication system;
(b) the fabrication system has a build volume; and
(c) the build volume has a length, width and height, the length of the build volume being (i) at least fifty times greater than the width of the build volume and (ii) at least one hundred times greater than the height of the build volume.

4. The method of claim 1, wherein:
(a) during the photocuring, a planar surface of the first portion of the sheet touches, and is at an angle relative to, an upper surface of the liquid photopolymer; and
(b) the angle is greater than ten degrees and less than eighty degrees.

5. The method of claim 1, wherein:
(a) the actuators are electric motors that actuate rotation of wheels or rollers; and
(b) the rotation of the wheels or rollers actuates the moving of the sheet.

6. The method of claim 1, wherein:
(a) a digital micromirror device (DMD) performs the projecting;
(b) the DMD includes a lens; and
(c) at all times during the photocuring, the lens is stationary relative to one or more walls of the vat.

7. The method of claim 1, wherein the method further comprises pre-processing steps that occur before the first portion of the sheet enters the liquid photopolymer in the first vat, which pre-processing steps comprise:
(a) soaking or coating the first portion of the sheet with additional liquid photopolymer in a second vat;
(b) moving the first portion of the sheet from the second vat toward the first vat; and
(c) forming a build substrate, by photocuring the additional liquid photopolymer which has soaked or coated the first portion of the sheet.

8. The method of claim 1, wherein:
(a) a specific solid layer is one of the solid layers; and
(b) the moving includes
(i) after the specific solid layer solidifies, moving the sheet downward in the first vat by a first vertical distance, which first vertical distance has an absolute value that is greater than or equal to twice the absolute value of the vertical thickness of the specific solid layer, and
(ii) then, after liquid photopolymer entirely covers the solid object, moving the sheet upward in the first vat by a second vertical distance, the absolute value of the second vertical distance being less than the absolute value of the first vertical distance.

9. The method of claim 1, wherein the moving of the sheet simultaneously actuates motion of not only the first solid object but also other solid objects, which other solid objects are separate from the first solid object and have been formed by photocuring of liquid photopolymer in the first vat.

10. The method of claim 1, wherein the sheet remains attached to, and is part of, the first solid physical object even after fabrication of the object is complete.

11. The method of claim 1, wherein:
(a) the method further comprises removing the sheet from the first solid object; and
(b) the removing is performed by mechanical abrasion or by one or more chemical reactions.

12. The method of claim 1, wherein the method further comprises re-using the sheet, by moving the sheet in such a way that the first portion of the sheet repeatedly enters and then exits the first vat.

13. The method of claim 1, wherein the sheet comprises a loop.

14. A system comprising:
(a) a sheet;
(b) a first vat;
(c) a digital micromirror device (DMD);
(d) actuators; and
(e) one or more computers; wherein
(i) the actuators are configured to actuate motion of the sheet in such a way that a first portion of the sheet enters and then exits the first vat, while the first vat contains liquid photopolymer,
(ii) the one or more computers are configured to control the motion of the sheet by controlling the actuators, and
(iii) the DMD is configured to fabricate solid layers of a first solid object, by projecting a temporal sequence of spatial light patterns unto the liquid photopolymer in the first vat, in such a way that each spatial light pattern in the sequence causes a portion of the liquid photopolymer to solidify into one of the solid layers.

15. The system of claim 14, wherein the sheet has a length, width and height, the length of the sheet being (a) at least fifty times greater than the width of the sheet and (b) at least one hundred times greater than the height of the sheet.

16. The system of claim 14, wherein the first vat and the sheet are configured in such a way that:
(a) during the photocuring, a planar surface of the first portion of the sheet touches, and is at an angle relative to, an upper surface of the liquid photopolymer; and
(b) the angle is greater than ten degrees and less than eighty degrees.

17. The system of claim 14, wherein:
(a) the actuators comprise (i) electric motors and (ii) wheels or rollers; and
(b) the electric motors are configured to actuate rotation of the wheels or rollers, which rotation in turn actuates the motion of the sheet.

18. The system of claim 14, wherein:
(a) the DMD includes a lens; and
(b) the lens is stationary relative to one or more walls of the vat, at all times during the projecting.

19. The system of claim 14, wherein:
(a) the system further comprises a second vat;
(b) the actuators are configured to actuate the motion of the sheet, in such a way that the first portion of sheet enters the second vat, then is soaked or coated with additional liquid photopolymer that is in the second vat, then exits the second vat, and then travels toward the first vat; and
(c) the DMD is configured to fabricate a build substrate, by projecting light to photocure the additional liquid photopolymer which has soaked or coated the first portion of the sheet, in such a way that the build substrate is fabricated before the first portion of the sheet enters the liquid photopolymer that is in the first vat.

20. The system of claim 14, wherein:
(a) a specific solid layer is one of the solid layers; and
(b) the actuators are configured to actuate the motion of the sheet in such a way that
  (i) after the specific solid layer solidifies, the sheet moves downward in the first vat by a first vertical distance, which first vertical distance has an absolute value that is greater than or equal to twice the absolute value of the vertical thickness of the specific solid layer, and
  (ii) then, after liquid photopolymer entirely covers the solid object, the sheet moves upward in the first vat by a second vertical distance, the absolute value of the second vertical distance being less than the absolute value of the first vertical distance.

\* \* \* \* \*